(12) United States Patent
Lee et al.

(10) Patent No.: US 11,875,001 B2
(45) Date of Patent: *Jan. 16, 2024

(54) TOUCH SENSOR AND DISPLAY DEVICE

(71) Applicant: Samsung Display Co., LTD., Yongin-si (KR)

(72) Inventors: Choon Hyop Lee, Anyang-si (KR); Kang Won Lee, Seoul (KR); Sang Chul Lee, Yongin-si (KR); Seung Hwan Chung, Seongnam-si (KR)

(73) Assignee: Samsung Display Co., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,775

(22) Filed: Dec. 15, 2019

(65) Prior Publication Data
US 2020/0241664 A1 Jul. 30, 2020

(30) Foreign Application Priority Data
Jan. 30, 2019 (KR) .................. 10-2019-0012214

(51) Int. Cl.
*G06F 3/044* (2006.01)
*G06F 3/0354* (2013.01)
*G06F 3/041* (2006.01)

(52) U.S. Cl.
CPC .......... *G06F 3/044* (2013.01); *G06F 3/03547* (2013.01); *G06F 3/0414* (2013.01); *G06F 2203/04103* (2013.01)

(58) Field of Classification Search
CPC .. G06F 3/0446; G06F 3/03547; G06F 3/0416; G06F 3/044; G06F 3/0412; G06F 3/0414; G06F 3/0443; G06F 3/045; G06F 3/04142; G06F 3/04144; G06F 3/04146; G06F 2203/04103; G06F 2203/04105
USPC ........................................................ 345/174
See application file for complete search history.

(56) References Cited

U.S. PATENT DOCUMENTS

| 8,716,932 | B2 | 5/2014 | Rappoport et al. |
| 10,579,181 | B2 | 3/2020 | Lee et al. |
| 10,592,056 | B2 | 3/2020 | Lee et al. |
| 10,685,603 | B2 | 6/2020 | Jeong et al. |
| 10,936,134 | B2 | 3/2021 | Kim et al. |
| 11,314,363 | B2 * | 4/2022 | Hwang ............... G06F 3/04144 |
| 2015/0138041 | A1 * | 5/2015 | Hirakata ............. H01L 51/0097 345/1.3 |

(Continued)

FOREIGN PATENT DOCUMENTS

| CN | 102683384 | 9/2012 |
| CN | 105320354 | 2/2016 |

(Continued)

OTHER PUBLICATIONS

Office Action dated Nov. 2, 2023, issued to Korean Patent Application No. 10-2019-0012214.

*Primary Examiner* — Jimmy H Nguyen
(74) *Attorney, Agent, or Firm* — H.C. Park & Associates, PLC

(57) ABSTRACT

A touch sensor includes: a base layer; a plurality of first touch electrodes arranged on the base layer in a first direction; and at least one strain gauge disposed between the plurality of first touch electrodes, the at least one strain gauge configured to sense a pressure, wherein the plurality of first touch electrodes and the strain gauge are arranged on the same layer.

12 Claims, 28 Drawing Sheets

(56) References Cited

U.S. PATENT DOCUMENTS

| | | | |
|---|---|---|---|
| 2016/0103545 A1 | 4/2016 | Filiz et al. | |
| 2017/0010730 A1 | 1/2017 | Chuang et al. | |
| 2017/0285864 A1* | 10/2017 | Pedder | G06F 3/045 |
| 2017/0371471 A1* | 12/2017 | Kim | G06F 3/0448 |
| 2018/0059839 A1* | 3/2018 | Kim | H01L 51/5284 |
| 2018/0323240 A1* | 11/2018 | Won | G06F 3/0412 |

FOREIGN PATENT DOCUMENTS

| | | |
|---|---|---|
| CN | 106325583 | 1/2017 |
| CN | 109102776 | 12/2018 |
| CN | 109284027 | 1/2019 |
| CN | 110502141 | 11/2019 |
| CN | 111176478 | 5/2020 |
| JP | 2016-76136 | 5/2016 |
| KR | 10-2017-0033209 | 3/2017 |
| KR | 10-2017-0096476 | 8/2017 |
| KR | 2018-0000665 | 1/2018 |
| KR | 2018-0087527 | 8/2018 |
| KR | 10-2018-0126264 | 11/2018 |

\* cited by examiner

SG_1: 151a, 151b, 153a, 153b, 153c
153_1: 153a, 153b, 153c
PL: PL1, PL2

TOUCH SENSOR AND DISPLAY DEVICE

CROSS-REFERENCE TO RELATED APPLICATION

This application claims priority from and the benefit of Korean Patent Application No. 10-2019-0012214, filed on Jan. 30, 2019, which is incorporated by reference for all purposes as if fully set forth herein.

BACKGROUND

Field

Exemplary embodiments of the invention relates to a touch sensor and a display device.

Discussion of the Background

A display device for displaying an image is used for various electronic appliances for providing an image to a user, such as smart phones, tablet PCs, digital cameras, notebook computers, navigators, and televisions. The display device includes a display panel for generating and displaying an image and various input devices.

Recently, in the fields of smart phones and tablet PCs, a touch sensor recognizing a touch input has been widely applied to a display device. The touch sensor has a trend to replace the existing physical input device such as a keypad because of the convenience of touching.

Research has been conducted to utilize a pressure sensor for detecting the intensity of pressure as a substitute for a physical button by applying the pressure sensor to a display device, in addition to the touch sensor for detecting a touch position.

The above information disclosed in this Background section is only for understanding of the background of the inventive concepts, and, therefore, it may contain information that does not constitute prior art.

SUMMARY

Devices constructed according to exemplary implementations of the invention provide a touch sensor capable of sensing a touch position and a touch pressure.

Additional features of the inventive concepts will be set forth in the description which follows, and in part will be apparent from the description, or may be learned by practice of the inventive concepts.

According to one or more embodiments of the invention, a touch sensor includes: a base layer; a plurality of first touch electrodes arranged on the base layer in a first direction; and at least one strain gauge disposed between the plurality of first touch electrodes, the at least one strain gauge configured to sense a pressure, wherein the plurality of first touch electrodes and the strain gauge are arranged on the same layer.

The touch sensor may further include: a plurality of second touch electrodes arranged in a second direction crossing the first direction, wherein the strain gauge may be disposed between the plurality of second touch electrodes in the second direction.

The touch sensor may further include: a first connection electrode connecting the plurality of first touch electrodes in the first direction, wherein the first connection electrode may be disposed between the base layer and the plurality of first touch electrode.

The touch sensor may further include: a pressure signal line electrically connected to the strain gauge, the pressure signal line including a first portion and a second portion, wherein the first portion of the pressure signal line may extend in the first direction and may be disposed between the plurality of first touch electrodes.

The touch sensor may further include: a plurality of sensing lines electrically connected to the plurality of second touch electrodes, wherein the second portion of the pressure signal line may extend in the second direction and may be disposed between the plurality of sensing lines.

The strain gauge may include at least one resistance line, and the at least one resistance line overlaps the first connection electrode in a thickness direction.

The touch sensor may further include: a second connection electrode connecting the plurality of second touch electrodes in the second direction, wherein the second connection electrode and the first connection electrode may be disposed on different layers from each other, and the second connection electrode overlaps the first connection electrode in the thickness direction.

The touch sensor of may further include: a temperature compensation unit disposed between the base layer and the strain gauge, wherein the strain gauge may include at least one resistance line, the temperature compensation unit includes a temperature compensation pattern, and the temperature compensation pattern overlaps the resistance line in a thickness direction.

The temperature compensation unit may further include a temperature compensation line electrically connected to the temperature compensation pattern and arranged on the same layer as the strain gauge.

The touch sensor may further include: an insulating layer disposed between the temperature compensation pattern and the resistance line, wherein the insulation layer may include a contact hole exposing a part of the temperature compensation pattern, and the temperature compensation line may be electrically connected to the temperature compensation pattern through the contact hole.

The touch sensor may further include: a Wheatstone bridge circuit unit electrically connected to the strain gauge, the Wheatstone bridge circuit unit including: a first node to which a driving voltage may be applied; a second node connected to a ground; a first output node; and a second output node, wherein one end of the strain gauge may be electrically connected to the first node, and the other end of the strain gauge may be electrically connected to the first output node.

According to one or more embodiments of the invention, a touch sensor, including: a main sensing area; and a first sub-sensing area extending from the main sensing area in a first direction, the first sub-sensing area including: a first area in which a plurality of touch electrodes are arranged; and a second area in which strain gauge is disposed, wherein the first area may surround the second area, and the first area does not overlap the second area in a thickness direction.

The touch sensor may further include: a second sub-sensing area extending from the main sensing area in a second direction crossing the first direction; a corner wing connecting the first sub-sensing area and the second sub-sensing area; a pad unit disposed under the second sub-sensing area; and a pressure signal line electrically connecting the strain gauge and the pad unit, wherein the pressure signal line may be arranged to pass through the corner wing.

The touch sensor may further include: a plurality of sensing lines electrically connecting the plurality of touch electrodes and the pad unit, wherein the plurality of sensing lines may be arranged to pass through the corner wing, and may be spaced apart from the pressure signal line.

The pressure signal line may be disposed between the plurality of sensing lines.

According to one or more embodiments of the invention, a display device, including: a display unit including: a main display area including a plurality of pixels; and a sub-display area bent from the main display area and including a plurality of pixels; and a touch sensor disposed on the display unit, the touch sensor including: a main sensing area corresponding to the main display area; and a sub-sensing area corresponding to the sub-display area, wherein the touch sensor includes: a plurality of first touch electrode arranged in a first direction; and at least one strain gauge disposed between the plurality of first touch electrodes in the first direction, the at least one strain gauge configured to sense a pressure, and wherein the plurality of first touch electrodes and the strain gauge are arranged on the same layer.

The display device may further include: a plurality of second touch electrodes arranged in a second direction crossing the first direction, wherein the strain gauge may be disposed between the plurality of second touch electrodes in the second direction.

The sub-sensing area includes a first area in which the strain gauge may be disposed, and a second area in which the plurality of first touch electrodes and the plurality of second touch electrodes may be arranged, and wherein the first area may not overlap the second area in a thickness direction.

The display device may further include: a pressure signal line electrically connected to the strain gauge, the pressure signal line including a first portion and a second portion, wherein the first portion of the pressure signal line may extend in the first direction and may be disposed between the plurality of first touch electrodes.

The display device may further include: a plurality of sensing lines electrically connected to the plurality of second touch electrodes, wherein the second portion of the pressure signal line may extend in the second direction and may be disposed between the plurality of sensing lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
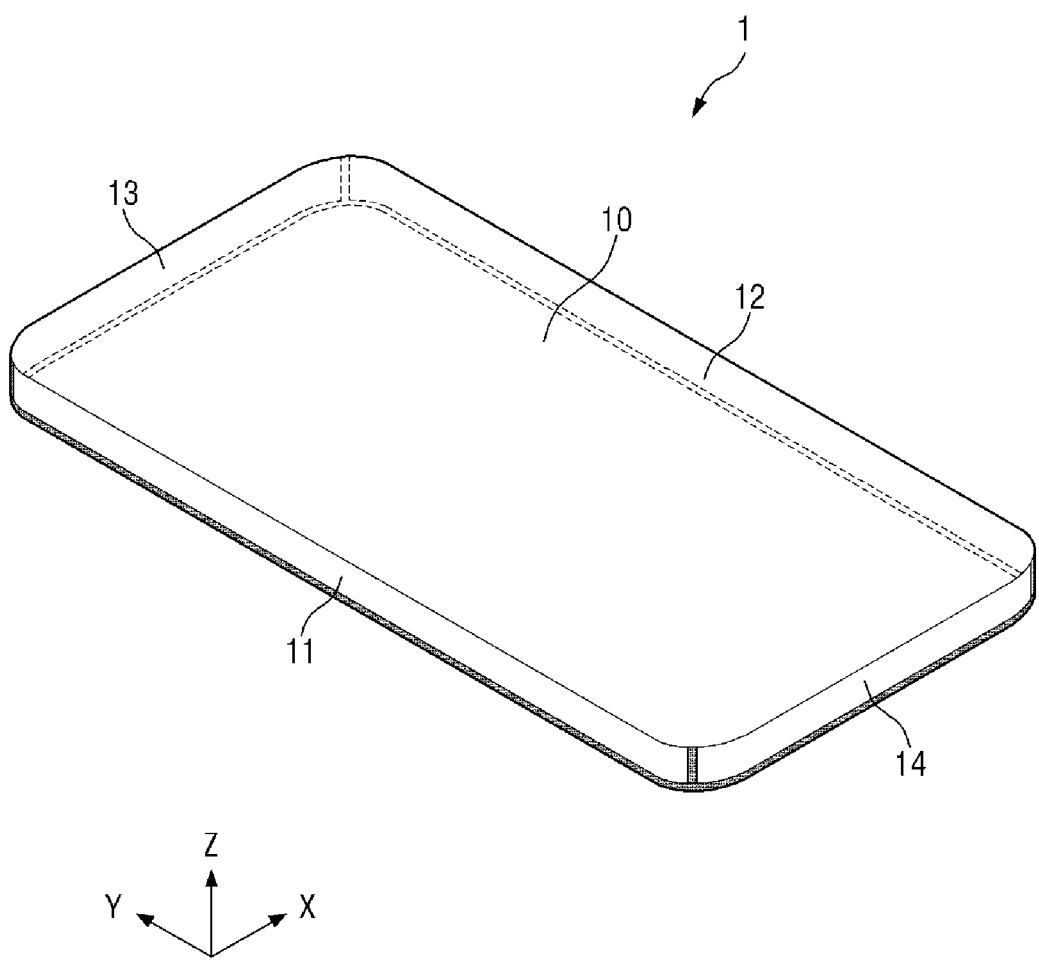
FIG. 1 is a perspective view of a display device according to an exemplary embodiment.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z-axes, and may be interpreted in a broader sense. For example, the X-axis, the Y-axis, and the Y-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

It will be apparent to those skilled in the art that various modifications and variations can be made to the disclosed embodiments without departing from the spirit and scope of the inventive concepts. Thus, it is intended that the inventive concepts cover the modifications and variations of the disclosed embodiments provided they come within the scope of the appended claims and their equivalents.

Throughout the specification, the same reference numerals are used for the same or similar elements.

In this specification, the "on", "over", "top", "upper side", or "upper surface" refers to an upward direction, that is, a Z-axis direction, with respect to a display panel 300, and the "beneath", "under", "bottom", "lower side", or "lower surface" refers to a downward direction, that is, a direction opposite to the Z-axis direction, with respect to the display panel 300. Further, the "left", "right", "upper", and "lower" refer to directions when the display panel 300 is viewed from the plane. For example, the "left" refers to a direction opposite to the X-axis direction, the "right" refers to the X-axis direction, the "upper" refers to the Y-axis direction, and the "lower" refers to a direction opposite to the Y-axis direction.

Hereinafter, embodiments of the present invention will be described with reference to the attached drawings.

FIG. 1 is a perspective view of a display device according to an exemplary embodiment.

Referring to FIG. 1, a display device 1 may display an image. For example, the display device may be an organic light emitting display (OLED), a liquid crystal display (LCD), a plasma display panel (PDP), a field emission display (FED), an electrophoretic display (EPD), or the like. Hereinafter, the display device 1 will be mainly described as an organic light emitting display device, but the exemplary embodiments are not limited thereto.

The display device 1 may be applied to various products such as televisions, notebooks, monitors, billboards, internet of things (IOTs) as well as portable electronic appliances such as mobile phones, smart phones, tablet personal computers (tablet PCs), smart watches, watch phones, mobile communication terminals, electronic notebooks, electronic books, portable multimedia players (PMPs), navigators, and ultra mobile PCs (UMPCs).

The display device 1 may include a main display surface 10 and sub-display surfaces 11, 12, 13, and 14.

The main display surface 10 may have a substantially plate shape, may be located on one plane of the display device 1, and may have the largest area (or size) of areas of the main display surface 10 and sub-display surfaces 11, 12, 13, and 14. For example, the main display surface 10 may be located on the upper surface of the display device 1. The main display surface 10 may have a planar shape such as a polygonal shape (for example, a rectangle), a circle, or an ellipse. In some exemplary embodiments, the main display surface 10 may be a curved surface having a constant curvature.

The sub-display surfaces 11, 12, 13, and 14 may be located on a plane different from the plane where the main display surface 10 is located. Each of the sub display faces 11, 12, 13, and 14 has an area smaller than the area of the main display face 10, and the sub-display surfaces 11, 12, 13, and 14 may be located on mutually different planes. The sub-display surfaces 11, 12, 13, and 14 may be connected to the sides of the main display surface 10, respectively, and may be bent or curved from the main display surface 10 (or sides of the main display surface 10).

For example, when the main display surface 10 has a rectangular shape, the display device 1 may include a first sub-display surface 11, a second sub-display surface 12, a third sub-display surface 13, and a fourth sub-display surface 11, 12, 13, and 14, and the first to fourth sub-display surfaces 11, 12, 13, and 14 may be connected to four sides of a rectangle, respectively. However, the exemplary embodiments are not limited thereto, and the display device 1 may include some of the first to fourth sub-display surfaces 11, 12, 13, and 14. For example, the display device 1 may include only the first sub-display surface 11 and the second sub-display surface 12, may include only the third sub-display surface 13 and the fourth sub-display surface 14, and may include at least one of the first to fourth sub-display surfaces 11, 12, 13, and 14.

The first sub-display surface 11 may be connected to a first long side of the main display surface 10, and may be bent in a direction perpendicular to the main display surface 10 to constitute a left surface of the display device 1. Similarly, the second sub-display surface 12 may be connected to a second long side of the main display surface 10, and may be bent in a direction perpendicular to the main display surface 10 to constitute a right surface of the display device 1. The third sub-display surface 13 may be connected to a first short side of the main display surface 10 to constitute an upper surface of the display device 1, and the fourth sub-display surface 14 may be connected to a second short side of the main display surface 10 to constitute a lower surface of the display device 1.

In this case, the display device 1 may be a multi-view stereoscopic display device that displays an image on an upper surface and side surfaces connected to the upper surface.

Figure 2:
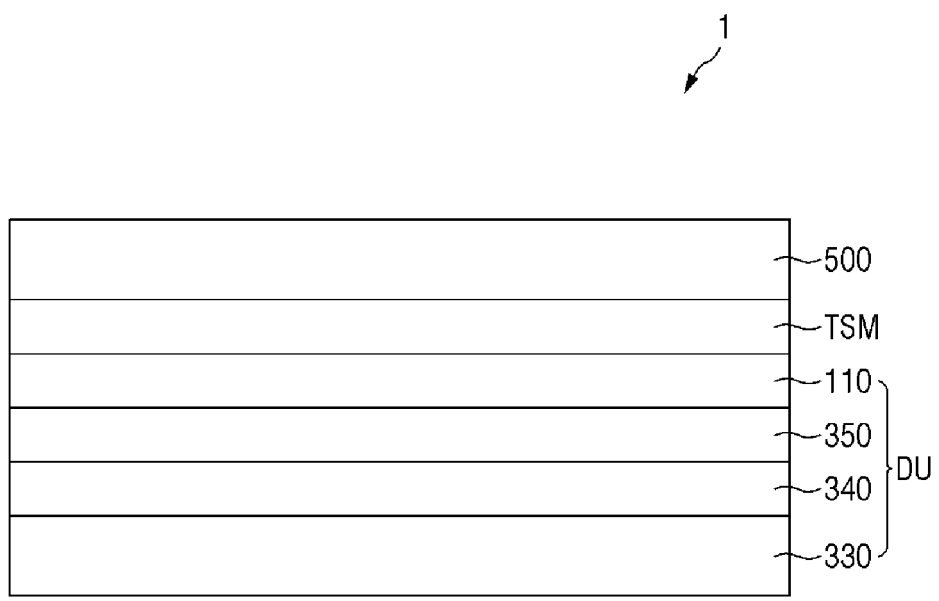
FIG. 2 is a schematic cross-sectional view of a display device according to an exemplary embodiment.

FIG. 2 is a schematic cross-sectional view of a display device according to an exemplary embodiment.

Referring to FIG. 2, the display device 1 may include a display unit DU, a touch sensor TSM disposed on the display unit DU, and a protective layer 500 disposed on the touch sensor TSM. Such an arrangement is an example, and is not limited thereto. The touch sensor TSM may be disposed between the components constituting the display unit DU, and may also be disposed under the display unit DU.

The display unit DU may include a substrate 330, a thin film transistor layer 340 disposed on the substrate 330, a light emitting element layer 350 disposed on the thin film transistor layer 340, and a base layer 110 dispose on the light emitting element layer 350.

The substrate 330 may be made of an insulating material such as glass, quartz, or a polymer resin. Examples of the polymer resin may include polyethersulphone (PES), polyacrylate (PA), polyarylate (PAR), polyetherimide (PEI), polyethylenenapthalate (PEN), polyethylene tereptahalate (PET), polyphenylenesulfide (PPS), polyallylate, polyimide (PI), polycarbonate (PC), cellulosetriacetate (CAT), cellulose acetate propionate (CAP), and combinations thereof. Alternatively, the substrate 330 may include a metal material.

The substrate 330 may be a rigid substrate, or may be a flexible substrate capable of bending, folding, rolling, or the like. When the substrate 330 is a flexible substrate, the substrate 330 may be made of polyimide (PI), but the exemplary embodiments are not limited thereto.

The thin film transistor layer 340 may be disposed on the substrate 330. The thin film transistor layer 340 may be provided with scan lines, data lines, power supply lines, scan control lines, pads, and link lines for connecting the data lines as well as thin film transistors of respective pixels. Each of the thin film transistors may include a gate electrode, a semiconductor layer, a source electrode, and a drain electrode.

Figure 3:
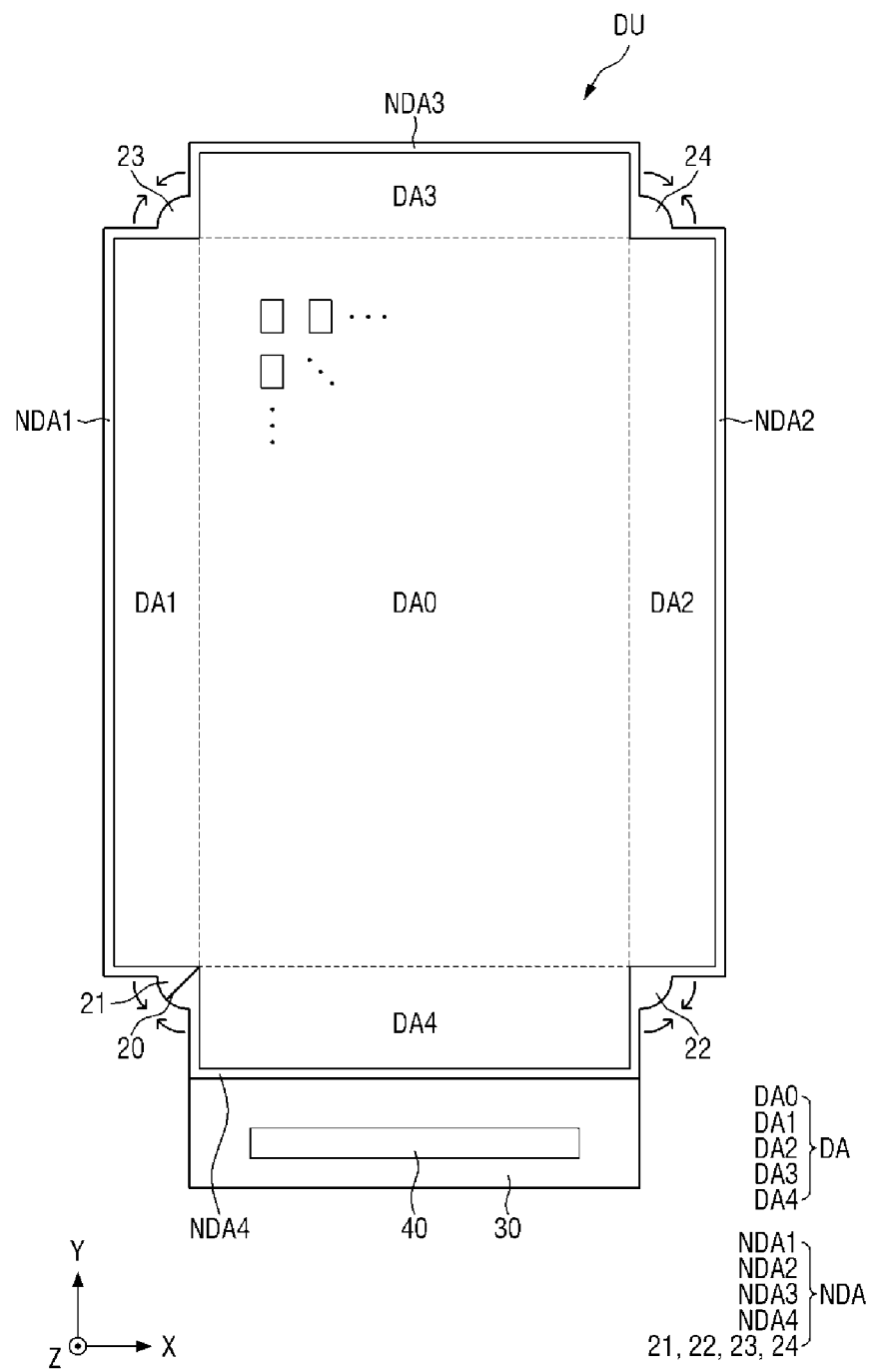
FIG. 3 schematically shows a planar unfolded view of a display unit according to an exemplary embodiment.

The thin film transistor layer 340 may be disposed in the display area DA and non-display area NDA shown in FIG. 3. Specifically, the thin film transistors of respective pixels, the scan lines, the data lines, and the power supply lines may be arranged in a first sub-display area DA1, a second sub-display area DA2, a third sub-display area DA3, and a fourth sub-display area DA4 as well as a main display area DA0. The scan control lines and link lines of the thin film transistor layer 340 may be arranged in the non-display area NDA.

The light emitting element layer 350 may be disposed on the thin film transistor layer 340. The light emitting element layer 350 may include pixels p including a first electrode, a light emitting layer, and a second electrode, and a pixel defining layer defining the pixels. The light emitting layer may be an organic light emitting layer including an organic material. In this case, the light emitting layer may include a hole transporting layer, an organic light emitting layer, and an electron transporting layer. When a predetermined voltage is applied to the first electrode through the thin film transistor of the thin film transistor layer 340 and a cathode voltage is applied to the second electrode through the thin film transistor of the thin film transistor layer 340, holes and electrons move to the organic light emitting layer through the hole transporting layer and the electron transporting layer, respectively, and are combined with each other in the organic light emitting layer to emit light. The pixels of the light emitting element layer 350 may be arranged in the display area DA shown in FIG. 3. For example, the pixels of the light emitting element layer 350 may be arranged in the first to fourth sub-display areas DA1, DA2, DA3, and DA4 as well as the main display area DA0. However, the exemplary embodiments are not limited thereto, and in some exemplary embodiments, the pixels of the light emitting element layer 350 may be arranged in the main display area DA0 and some of the first to fourth sub-display areas DA1, DA2, DA3, and DA4.

The base layer 110 may be disposed on the light emitting element layer 350. The base layer 110 may be a thin film encapsulation layer. The thin film encapsulation layer serves to prevent or suppress oxygen or moisture from penetrating the light emitting device layer 350. For this purpose, the thin film encapsulation layer may include at least one inorganic film. The inorganic film may be a silicon nitride layer, a silicon oxynitride layer, a silicon oxide layer, a titanium oxide layer, and an aluminum oxide layer, but is not limited thereto. In addition, the thin film encapsulation layer serves to protect the light emitting element layer 350 from foreign matter such as dust. For this purpose, the thin film encapsulation layer may include at least one organic film. The organic film may be an acryl resin layer, an epoxy resin layer, a phenolic resin layer, a polyamide resin layer, or a polyimide resin layer, but is not limited thereoto.

The thin film encapsulation layer may be disposed in both the display area DA and non-display area NDA shown in FIG. 3. Specifically, the thin film encapsulation layer may be disposed to cover the light emitting element layer 350 of the display area DA and the non-display area NDA and cover the thin film transistor layer 340 of the non-display area NDA.

The touch sensor TSM may be disposed on the base layer 110. For example, the thin film encapsulation layer may be used as the base layer 110 of the touch sensor TSM. When the touch sensor TSM is disposed directly on the thin film encapsulation layer, there is an advantage of reducing the thickness of the display device 1, compared to when a separate touch panel including the touch sensor TSM is attached onto the thin film encapsulation layer.

The protective layer 500 may be disposed on the touch sensor TSM. The protective layer 500 may include a window member, and may be attached onto the touch sensor TSM by a transparent adhesive member such as an optically clear adhesive (OCA) film.

In an exemplary embodiment, the display device 1 may further include an optical member. For example, an optical member such as a polarizing film may be interposed between the touch sensor TSM and the protective layer 500.

FIG. 3 schematically shows a planar unfolded view of a display unit according to an exemplary embodiment.

Referring to FIGS. 1 and 3, first, the display unit DU may include a display area DA and a non-display area NDA. The display area DA is an area that displays an image, and may include a pixel P which is a light emitting unit of a minimum unit for displaying an image. The non-display area NDA is an area that does not display an image, and may not include the pixel P.

The display area DA may include a main display area DA0 and first to fourth sub-display areas DA1, DA2, DA3, and DA4.

The main display area DA0 of the display unit DU may correspond to the main display surface 10 of the display device 1. For example, the main display surface 10 may include only the main display area DA0. The first sub-display area DA1 of the display unit DU may correspond to the first sub-display surface 11 of the display device 1. The first sub-display area DA1 may be connected to the main display area DA0. Similarly, the second to fourth sub-display areas DA2, DA3, and DA4 of the display unit DU may correspond to the second to fourth sub-display surfaces 12, 13, and 14 of the display device 1, respectively, and each of the second to fourth sub-display areas DA2, DA3, and DA4 may be connected to the main display area DA0.

The non-display area NDA may be disposed along the outermost edge of the display area DA on the planar unfolded view of the display unit DU. A driving wiring, a driving circuit, and the like may be disposed in the non-display area NDA. The non-display area NDA may include a black matrix for blocking leakage light, a decoration ink, and the like, but the exemplary embodiments are not limited thereto.

The non-display area NDA may include a first non-display area NDA1, a second non-display area NDA2, a third non-display area NDA3, and a fourth non-display area NDA4 (or first to fourth sub-non-display areas). The first non-display area NDA1 of the display unit DU may be located on the first sub-display surface 11 of the display device 1. Similarly, the second to fourth non-display areas NDA2, NDA3, and NDA4 of the display unit DU may be located on the second to fourth sub-display surfaces 12, 13, and 14 of the display device 1, respectively.

In some exemplary embodiments, the non-display area NDA may include a first corner wing 21, a second corner wing 22, a third corner wing 23, and a fourth corner wing 24. Each of the first to fourth corner wings 21, 22, 23, and 24 may be disposed adjacent to an edge of the main display area DA0 (that is, a portion where two sides meet). The first to fourth corner wings 21, 22, 23, and 24 may be substantially identical to each other except for their positions. Hereinafter, common characteristics of the first to fourth corner wings 21, 22, 23, and 24 will be described with reference to the first corner wing 21, and redundant description will not be repeated.

The first corner wing 21 may have a shape protruding outward from the edge of the main display area DA0. The first corner wing 21 may be located between the first sub-display area DA1 and the fourth sub-display area DA4 (or between the first sub-display surface 11 and the fourth sub-display surface 14), and may reduce the intersection angle between the first sub-display area DA1 and the fourth sub-display area DA4 to an obtuse angle. One end of the first corner wing 21 may be located in the first sub-display area DA1, and the other end thereof may be located in the fourth sub-display area D4. One end of the first corner wing 21 may be connected to the first non-display area NDA1, and the other end thereof may be connected to the fourth non-display area NDA4.

The first corner wing 21 may provide a space for arranging or passing signal wirings. When the first sub-display area DA1 and fourth sub-display area DA4 of the display unit DU are bent to constitute the first sub-display surface 11 and fourth sub-display surface 11 of the display device 1, the first corner wing 21 may be folded inward (that is, in a direction toward the inner space or gravity center of the display device 1). In this case, the first corner wing 21 is bent along a bending line 20, and thus one end of the first corner wing 21 (that is, a first portion adjacent to the first sub-display region DA1) and the other end of the first corner wing 21 (that is, a second portion adjacent to the fourth sub-display region DA4) may face each other. One end and the other end of the first corner wing 21 may be in contact with each other or may be coupled through a coupling layer or the like.

Since the first corner wing 21 is folded inward at the time of bending the first sub-display area DA1 and the fourth sub-display area DA4, the first corner wing 21 may not be exposed to the outside, and similarly, the second corner wing 22, the third corner wing 23 and the fourth corner wing 24 may not be exposed to the outside. Therefore, the first to fourth corner wings 21, 22, 23, and 24 may be included in the non-display area NDA.

A driving area 30 may be disposed at one side of the non-display area NDA, and the driving area 30 may be connected to one side of the fourth non-display area DA4. However, the exemplary embodiments are not limited thereto, and the driving area 30 may be connected to at least one of the first to fourth sub-display areas DA1, DA2, DA3, and DA4.

As shown in FIG. 1, when the fourth sub-surface 14 is bent vertically with respect to the main display surface 10, the driving area 30 is bent once more vertically with respect to the fourth sub-display surface 14 (that is, bent at an angle of 180° with respect to the main display surface 10), and thus the driving area 30 may be disposed under the main display surface 10 in the thickness direction of the main display surface 10). The driving area 30 may overlaps the main display surface 10, and may be parallel to the main display surface 10.

The display unit DU may include a display driver 40 disposed in the driving area 30. The display driver 40 is electrically connected to the display unit DU and supplies signals necessary for driving the display unit DU. For example, the display driver 40 may include at least one of a scan driver for supplying a scan signal to scan lines, a data driver for supplying data signals to data lines, and a timing controller for driving the scan driver and the data driver. According to an exemplary embodiment, the scan driver, the data driver, and/or the timing controller may be integrated in one display IC (D-IC), but the exemplary embodiments are not limited thereto. For example, in another exemplary embodiment, at least one of the scan driver, the data driver, and the timing controller may be integrated or mounted on the non-display area NDA.

Figure 4:
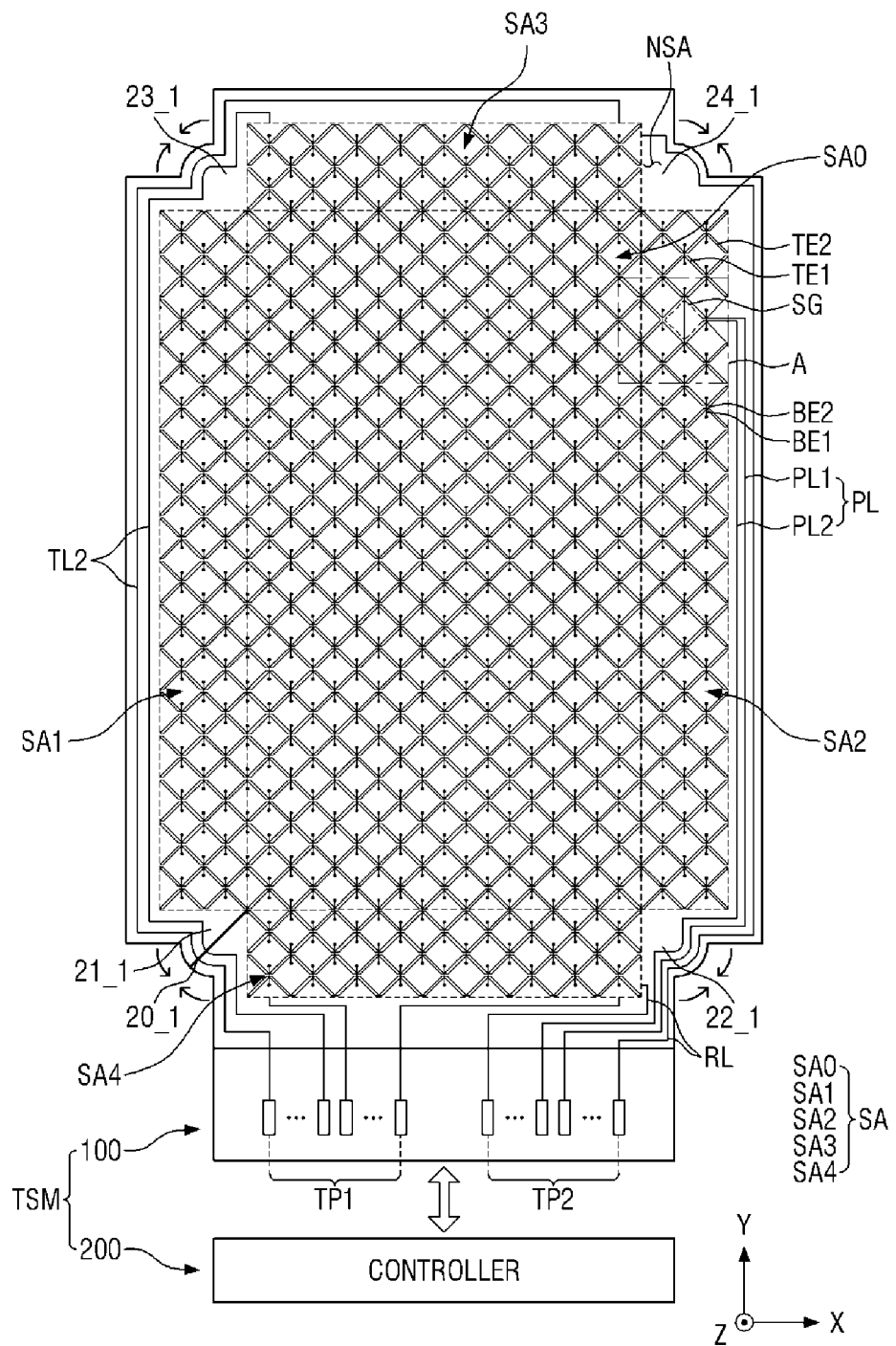
FIG. 4 schematically shows a planar unfolded view of a touch sensor according to an exemplary embodiment.
Figure 5:
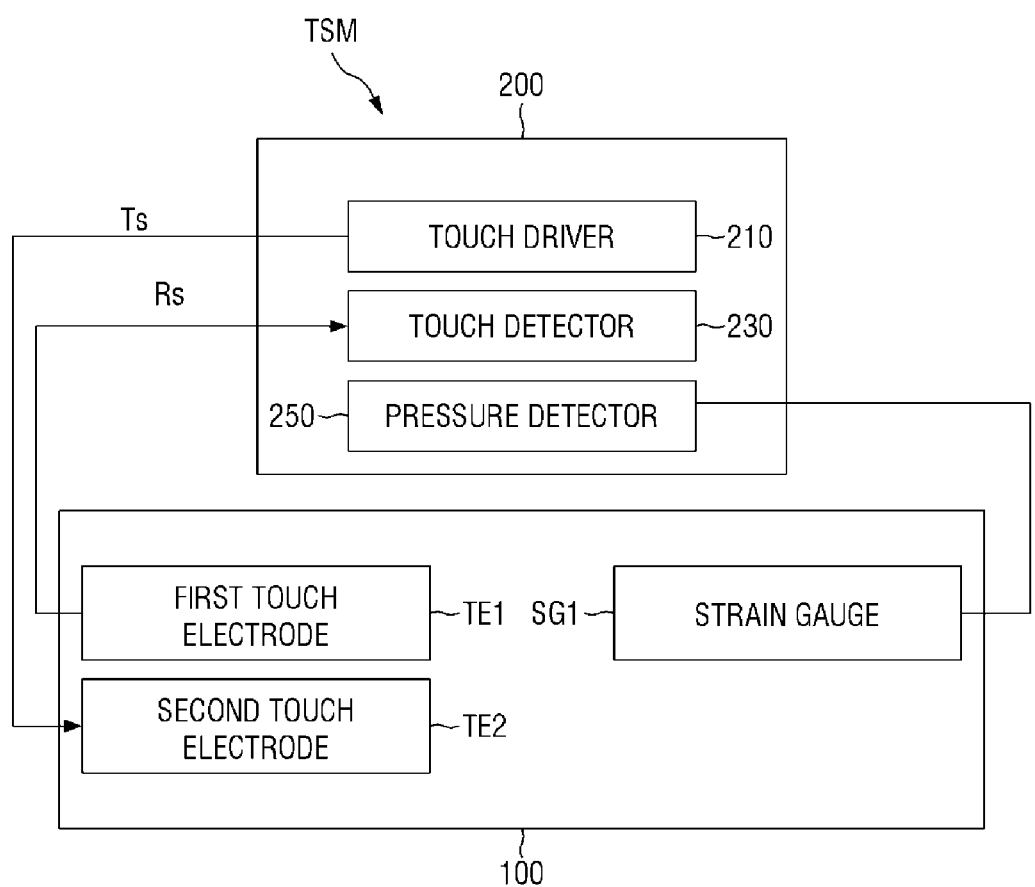
FIG. 5 is a block diagram of the touch sensor of FIG. 4.

FIG. 4 schematically shows a planar unfolded view of a touch sensor according to an exemplary embodiment, and FIG. 5 is a block diagram of the touch sensor of FIG. 4.

Referring to FIGS. 4 and 5, the touch sensor TSM may include a sensor unit 100 and a controller 200.

The sensor unit 100 includes a sensing area SA for sensing touch and pressure of a user and a non-sensing area NSA disposed around the sensor area SA. In some exemplary embodiments, the sensing area SA may overlap the display area DA of the display unit DU. For example, the sensing area SA may include a main sensing area SA0 and a first sub-sensing area SA1, a second sub-sensing area SA2, a third sub-sensing area SA3, and a fourth sub-sensing area SA4.

The main sensing area SA0 of the sensor unit 100 may correspond to the main display area DA0 of the display unit DU. The first sub-sensing area SA1 of the sensor unit 100 may correspond to the first sub-display area DA1 of the display unit DU. The first sub-sensing area SA1 may be connected to the main sensing area SA0. Similarly, the second to fourth sub-sensing areas SA2, SA3, and SA4 of the sensor unit 100 may correspond to the second to fourth sub-display areas DA2, DA3, and DA4 of the display unit DU, respectively, and each of the second to fourth sub-sensing areas SA2, SA3, and SA4 may be connected to the main sensing area SA0.

The non-sensing area NSA of the sensor unit 100 may include a first corner wing 21_1, a second corner wing 22_1, a third corner wing 23_1, and a fourth corner wing 24_1. Each of the first to fourth corner wings 21_1, 22_1, 23_1, and 24_1 may be disposed adjacent to an edge of the main sensing area SA0 (that is, a portion where two sides meet), and may provide a space for arranging or passing touch and pressure wirings. The first to fourth corner wings 21_1, 22_1, 23_1, and 24_1 of the sensor unit 100 may overlap the first to fourth corner wings 21, 22, 23, and 24 of the display unit DU. Since the positions and structures of the first to fourth corner wings 21_1, 22_1, 23_1, and 24_1 of the sensor unit 100 are substantially the same as those of the first to fourth corner wings 21, 22, 23, and 24 of the display unit DU, a redundant description will be omitted.

The sensing area SA may be provided with touch electrodes TE and RE for sensing a touch input and a strain gauge SG for sensing a touch pressure. Here, the sensing the touch input refers to sensing the presence or absence of a touch by a user and the position of the touch, and the sensing the touch pressure refers to sensing the intensity of a touch by the user.

The touch electrodes TE and RE and the strain gage SG may be arranged in different areas from each other. For example, the touch electrodes TE and RE may be arranged in the main sensing area SA0 and the first to fourth sub-sensing areas SA1, SA2, SA3, and SA4, respectively, but the touch electrodes TE and RE may be arranged to bypass the area where the strain gauge SG is disposed. The strain gage SG may be disposed in the first to fourth sub-sensing areas SA1, SA2, SA3, and SA4 in consideration of the function of sensing a pressure. For example, as shown in FIG. 4, the strain gage SG may be disposed in the second sub-sensing area SA2, and the touch electrodes TE and RE may be arranged in the main sensing area SA0 and the first to fourth sub-sensing areas SA1, SA2, SA3, and SA4, respectively, while bypassing the area where the strain gauge SG is disposed. However, the exemplary embodiments are not limited thereto, and the strain gage SG may be disposed in at least one of the first to fourth sub-sensing areas SA1, SA2, SA3, and SA4, and may also be disposed in the main sensing area SA0. Like this, even when the touch electrodes TE and RE and the strain gage SG may be arranged in different areas from each other, the touch electrodes TE and RE are disposed to surround the strain gauge SG, and thus it is not a problem to detect the presence or absence of a touch by a user and the position of the touch even in the area where the strain gauge SG is disposed.

The touch electrodes TE and RE may not overlap the strain gauge SG in a third direction (Z-axis direction) which is a thickness direction. For example, the touch electrodes TE and RE may not be arranged in the area where the strain gage SG is disposed. The touch electrodes TE and RE and the strain gauge SG may be arranged on the same layer. Like this, when the touch electrodes TE and RE and the strain gauge SG are arranged on the same layer, there is an advantage capable of respectively forming the touch electrodes TE and RE and the strain gauge SG through one process, and a thin film-type touch sensor TSM may be provided.

The touch electrodes TE1 and TE2 may include a first touch electrode TE1 and a second touch electrode TE2. One of the first touch electrode TE1 and the second touch electrode TE2 may be a driving electrode, and the other thereof may be a sensing electrode. Hereinafter, a case where the first touch electrode TE1 is a driving electrode and the second touch electrode TE2 is a sensing electrode will be described as an example, but the exemplary embodiments are not limited thereto.

The first touch electrodes TE1 may be electrically connected in a second direction (Y-axis direction), and the second touch electrodes TE2 may be electrically connected in a first direction (X-axis direction) crossing the second direction (Y-axis direction). Although it is illustrated in FIG. 4 that the first touch electrodes TE1 and the second touch electrodes TE2 are formed in a diamond-like planar shape, the exemplary embodiments are not limited thereto.

In order to prevent or suppress the first touch electrodes TE1 and the second touch electrodes TE2 from being short-circuited to each other at their crossing areas, the first touch electrodes TE1 adjacent to each other in the second direction (Y-axis direction) may be electrically connected through a first connection electrode BE1, and the second touch electrodes TE2 adjacent to each other in the first direction (X-axis direction) may be electrically connected through a second connection electrode BE2. In this case, the first touch electrodes TE1, the second touch electrodes TE2, and the second connection electrode BE2 may be arranged on one layer, and the first connection electrode BE1 may be disposed on a different layer from the first touch electrodes TE1, the second touch electrodes TE2, and the second connection electrode BE2. The first touch electrodes TE1 electrically connected in the second direction (Y-axis direction) are electrically insulated from the second touch electrodes TE2 electrically connected in the first direction (X-axis direction).

The non-sensing area NSA may be provided with touch lines TL and RL and pressure signal lines PL1 and PL2. The touch lines TL and RL may include first driving lines TL1 and second driving lines TL2 connected to the first touch electrodes TE1 and sensing lines RL connected to the second touch electrodes TE2.

The first touch electrodes TE1 arranged under the sensing area SA may be connected to the first driving lines TL1, and the first touch electrodes TE1 arranged on the sensing area SA may be connected to the second driving lines TL2. For example, among the first touch electrodes TE electrically connected in the second direction (Y axis direction), the first touch electrode TE1 disposed at the lower end of the sensing area SA may be connected to the first driving line TL1, and the first touch electrode TE2 disposed at the upper end of the sensing area SA may be connected to the second driving line TL2. The second driving lines TL2 may be connected to the first touch electrodes TE1 at the upper side of the sensing area SA through the first corner wing 21_1 and the third corner wing 23_1. The first driving lines TL1 and the second driving lines TL2 may be connected to a first touch pad unit TP1. Thus, the controller 200 may be electrically connected to the first touch electrodes TE1.

The second touch electrodes TE2 disposed at the right side of the sensing area SA may be connected to the sensing lines RL. For example, among the second touch electrodes TE2 electrically connected in the first direction (X-axis direction), the second touch electrode TE2 disposed at the right end of the sensing area SA may be connected to the sensing line RL. The sensing lines RL may be connected to a second touch pad unit TP2. Further, the sensing lines RL may pass through the second corner wing 22_1 and the fourth corner wing 24_1 depending on the position of the second touch electrode TE2. Accordingly, the controller 200 may be electrically connected to the second touch electrodes TE2.

The strain gauge SG may be disposed between the touch electrodes TE1 and TE2. For example, the strain gage SG may be disposed between the first touch electrodes TE1 in the second direction (Y-axis direction), and may be disposed between the second touch electrodes TE2 in the first direction (X-axis direction).

Although it is shown in FIG. 4 that one strain gauge SG is disposed, this is an example, and the exemplary embodiments are not limited thereto. In some exemplary embodiments, a plurality of strains SG may be arranged. The strain gauge SG may vary in length or cross-sectional area to change its resistance value when an external force is applied, and the strain gauge SG may be insulated from the touch electrodes TE1 and TE2.

One end of the first pressure signal line PL1 may be connected to one end of the strain gauge SG, and one end of the second pressure signal line PL2 may be connected to the other end of the strain gauge SG. Further, the other end of the first pressure signal line PL1 and the other end of the second pressure signal line PL2 may be connected to the second pad unit TP2. Accordingly, the controller 200 may be electrically connected to the strain gauge SG. The first pressure signal line PL1 and the second pressure signal line PL2 may be located between the first touch electrodes TE1 and between the sensing lines RL. Further, each of the first pressure signal line PL1 and the second pressure signal line PL2 may pass through the second corner wing 22_1, may be disposed between the sensing lines RL, and may be spaced apart from the sensing lines RL in the first direction (X-axis direction). However, the exemplary embodiments are not limited thereto. In some exemplary embodiments, the strain gage SG may be disposed in the first sub-sensing area SA1. In this case, the other end of the first pressure signal line PL1 and the other end the second pressure signal line PL2 may be connected to the first pad unit TP1, and each of the first pressure signal line PL1 and the second pressure signal line PL2 is disposed between the driving lines TL1 and TL2 and may be spaced apart from the driving lines TL1 and TL2 in the first direction (X-axis direction).

The controller 200 may be electrically connected to the sensor unit 100 to supply a driving signal Ts to the sensor unit 100, and may receive a sensing signal Rs corresponding to the driving signal Ts from the sensor unit 100 to detect a touch position. Further, the controller 200 may be electrically connected to the strain gauge SG to detect a touch pressure. The controller 200 may include a touch driver 210, a touch detector 230, and a pressure detector 250.

The touch driver 210 may provide a driving signal Ts for detecting a touch input to the first touch electrodes TE1.

The touch detector 230 may receive a sensing signal Rs corresponding to the driving signal Ts from the second touch electrodes TE2 to detect the presence or absence of a touch input and/or the position of the touch input. The sensing signal Rs may be a change in mutual capacitance between the first touch electrodes TE1 and the second touch electrodes TE2. More specifically, when a touch input is generated, a capacitance is changed at the point where the touch input is provided or at the periphery thereof. The touch detector 230 may receive a change in mutual capacitance between the first touch electrodes TE1 and the second touch electrodes TE2 as the sensing signal Rs, and may determine the presence or absence of the touch input and/or the position of the touch input using the change in mutual capacitance. However, the touch detection method is not limited to using the change in mutual capacitance change, and the touch may be detected using self-capacitance.

The touch detector 230 may include at least one amplifying circuit for amplifying the received sensing signal Rs, an analog digital converter connected to the output end of the amplifying circuit, and a processor.

The pressure detector 250 may be electrically connected to the strain gauge SG, and may detect a touch pressure on the basis of a change in resistance value of the strain gauge SG. The pressure detector 250 may include Wheatstone bridge circuit units electrically connected to the strain gage SG. The Wheatstone bridge circuit units may be provided in a number corresponding to the number of the strain gauges SG.

According to an exemplary embodiment, the touch driver 210, the touch detector 230, and the pressure detector 250 may be integrated in one touch IC. However, the exemplary embodiments are not limited thereto. In some other embodiments, the touch driver 210 and the touch detector 230 may be integrated in one touch IC, and the pressure detector 250 may be located in a portion other than the interior of the touch IC. Illustratively, the pressure detector 250 may be disposed on the driving area 30 of the display unit DU, or may be disposed on a separate flexible circuit board.

Hereinafter, the arrangement of the touch electrodes TE1 and TE2 and the strain gauge SG will be described in more detail with reference to FIGS. 6, 7, 8, 9, 10, 11, 12, 13, and 14.

Figure 6:
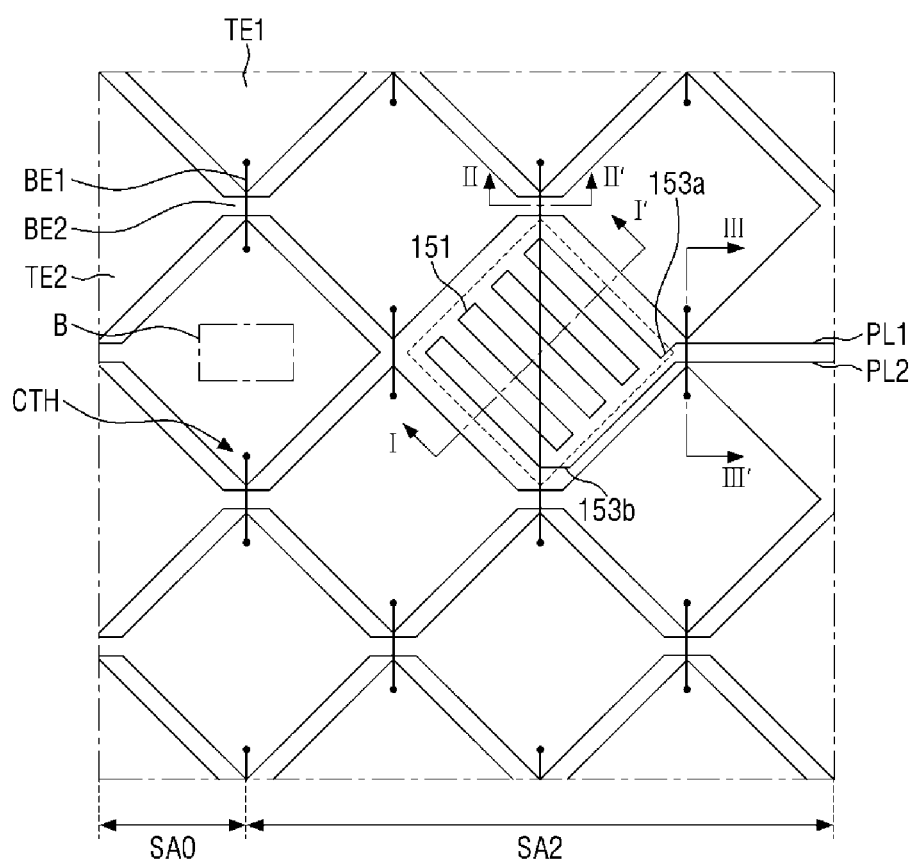
FIG. 6 is an enlarged plan view of the portion A of FIG. 4.
Figure 7:
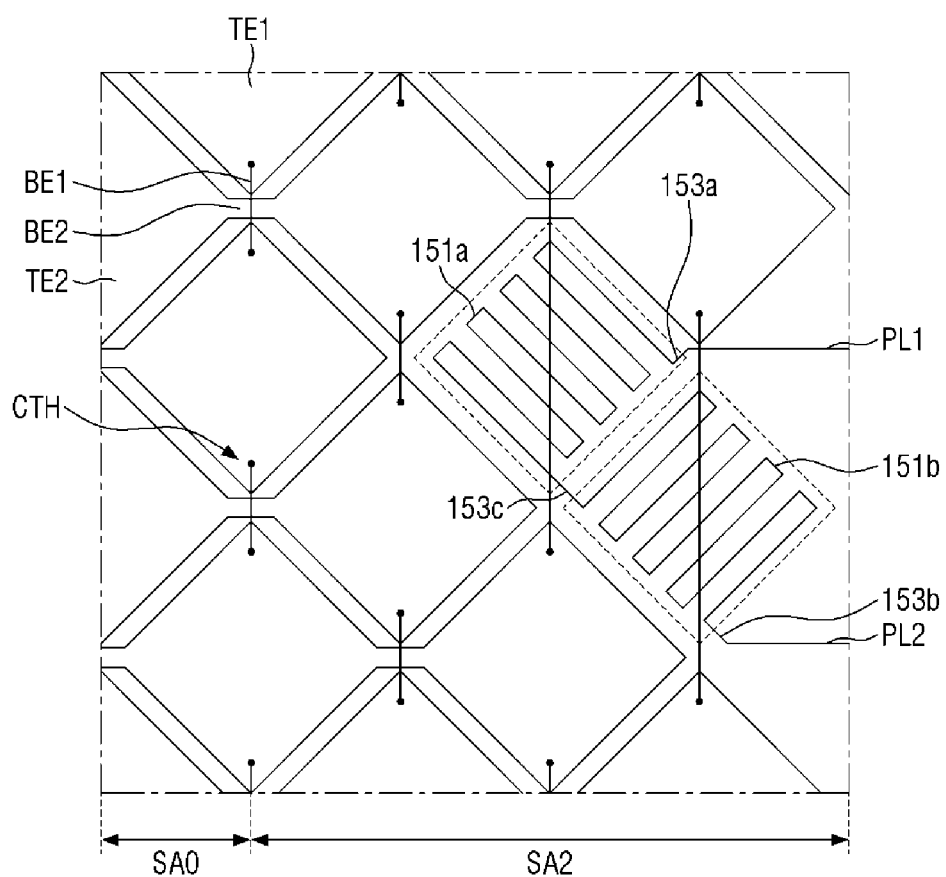
FIG. 7 is another enlarged plan view of the portion A of FIG. 4.
Figure 8:
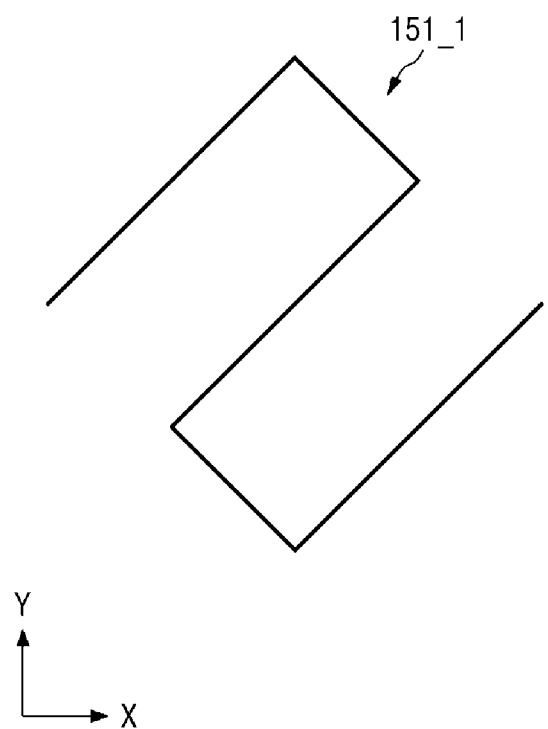
FIG. 8 is a plan view of a resistance line according to another exemplary embodiment.
Figure 9:
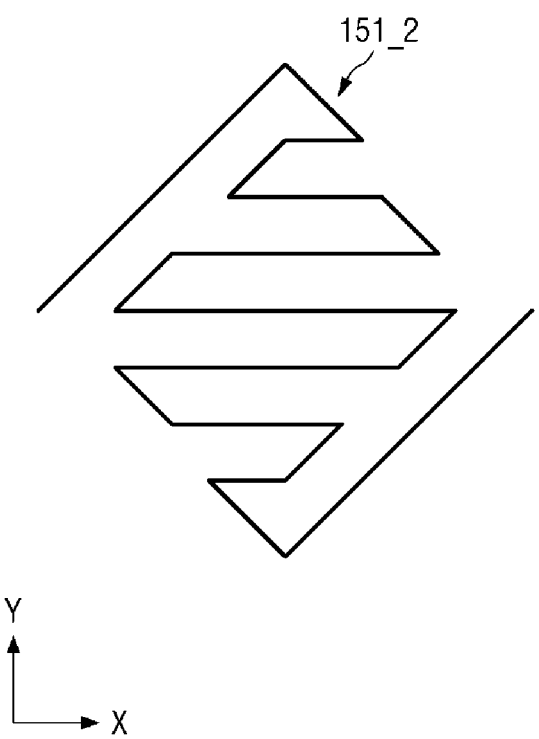
FIG. 9 is a plan view of a resistance line according to another exemplary embodiment.
Figure 10:
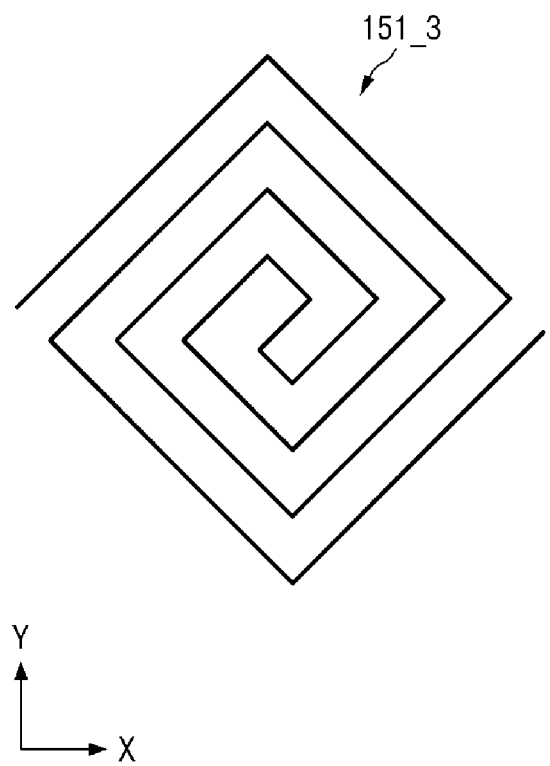
FIG. 10 is a plan view of a resistance line according to another exemplary embodiment.
Figure 11:
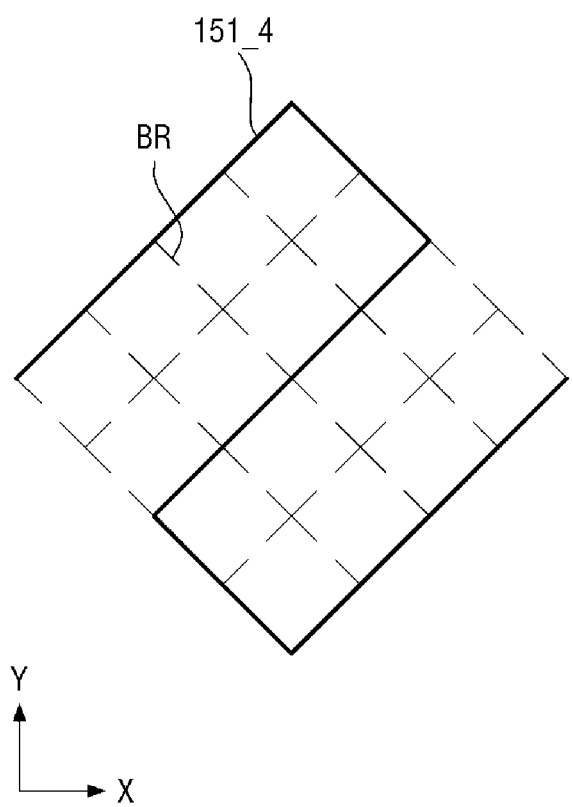
FIG. 11 is a plan view of a resistance line according to another exemplary embodiment.
Figure 12:
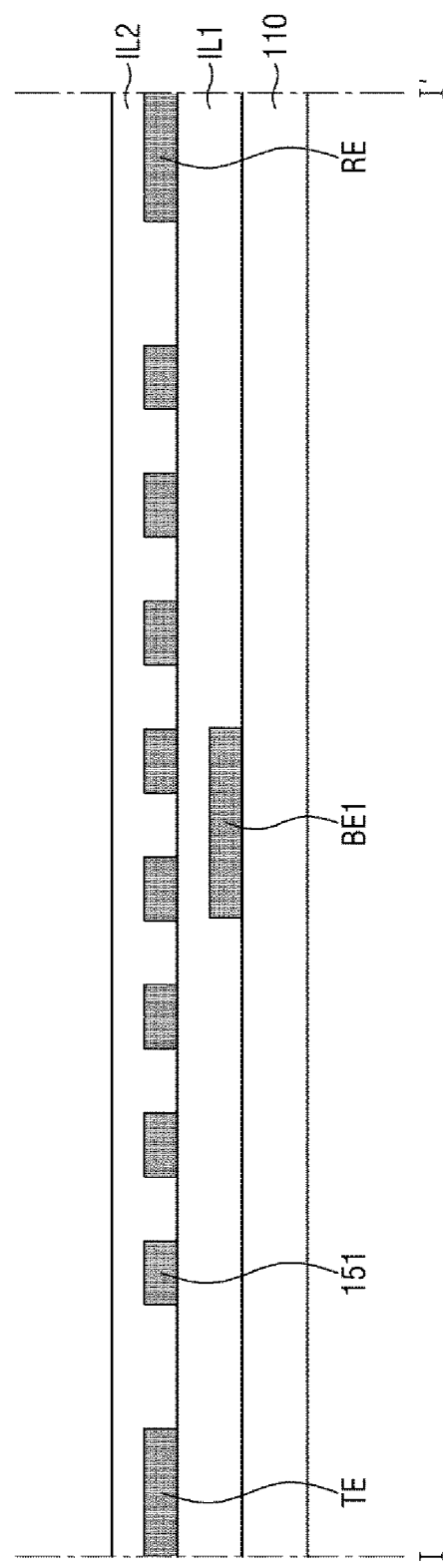
FIG. 12 is a cross-sectional view taken along a sectional line I-I' of FIG. 6.
Figure 13:
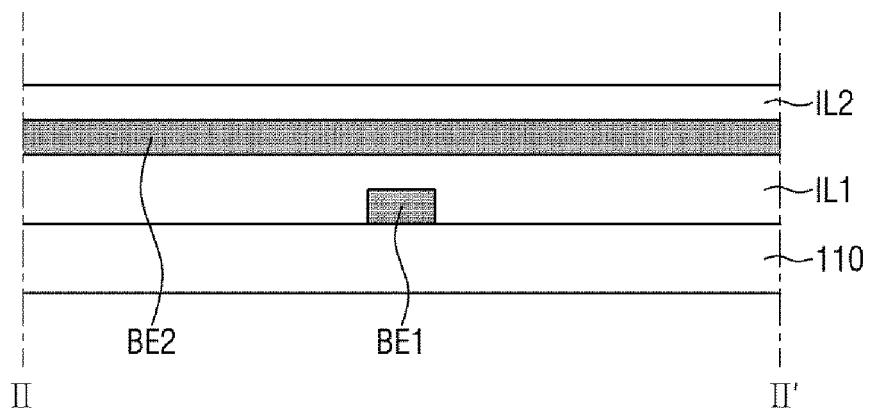
FIG. 13 is a cross-sectional view taken along a sectional line of FIG. 6.
Figure 14:
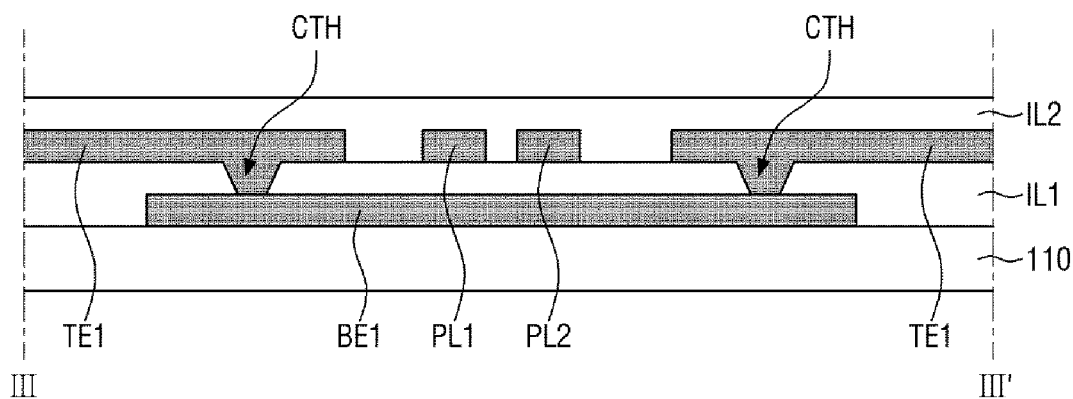
FIG. 14 is a cross-sectional view taken along a sectional line of FIG. 6.

FIG. 6 is an enlarged plan view of the portion A of FIG. 4, FIG. 7 is another enlarged plan view of the portion A of FIG. 4, FIG. 8 is a plan view of a resistance line according to another exemplary embodiment, FIG. 9 is a plan view of a resistance line according to another exemplary embodiment, FIG. 10 is a plan view of a resistance line according to another exemplary embodiment, FIG. 11 is a plan view of a resistance line according to another exemplary embodiment, FIG. 12 is a cross-sectional view taken along a sectional line I-I' of FIG. 6, FIG. 13 is a cross-sectional view taken along a sectional line of FIG. 6, and FIG. 14 is a cross-sectional view taken along a sectional line of FIG. 6.

Referring to FIGS. 6, 7, 8, 9, 10, 11, 12, 13, and 14, the sensor unit 100 includes a base layer 110, and first touch electrodes TE1, second touch electrodes TE2, first connection electrodes BE1, second connection electrodes BE2, and a strain gauge SG, which are arranged on the base layer 110.

The base layer 110 may be disposed in the sensing area SA and the non-sensing area NSA. The base layer 110 may be one of the layers constituting the display unit DU. For example, in an exemplary embodiment where the sensor unit 100 and the display unit DU are integrally implemented, the base layer 110 may be at least one layer constituting the display unit DU. Illustratively, the base layer 110 may be a thin film encapsulation (TFE) layer of the display unit DU. According to an exemplary embodiment, the base layer 110 may be a rigid substrate or a flexible substrate. For example, the base layer 110 may be a rigid substrate made of glass or reinforced glass, or a flexible substrate made of a thin film of a flexible plastic material. Hereinafter, a case where the base layer 110 is composed of at least one layer constituting the display unit DU, for example, a layer including a thin film encapsulation layer will be described as an example.

The second sub-sensing area SA2 may be provided with first touch electrodes TE1, second touch electrodes TE2 insulated from the first touch electrodes TE1, a strain gauge SG insulated from the first touch electrodes TE1 and the second touch electrodes TE2.

First connection electrodes BE1 may be arranged on the base layer 110. The first connection electrodes BE1 may electrically connect the first touch electrodes TE1 arranged along the second direction (Y-axis direction) to each other, and may be in contact with the first touch electrodes TE1. The first connection electrodes BE1 may be formed as a bridge-type connection pattern.

A first insulating layer IL1 may be disposed on the base layer 110 and the first connection electrodes BE1, and may include contact holes CTH exposing the first connection electrodes BE1. The first insulating layer IL1 may include an insulating material, and in some exemplary embodiments, the insulating material may be an inorganic insulating material or an organic insulating material. The inorganic insulating material may include at least one of aluminum oxide, titanium oxide, silicon oxide, silicon oxynitride, zirconium oxide, and hafnium oxide. The organic insulating material may be at least one of an acrylic resin, a methacrylic resin, polyisoprene, a vinyl resin, an epoxy resin, a urethane resin, a cellulose resin, a siloxane resin, a polyimide resin, a polyamide resin, and a perylene resin.

The first touch electrode TE1, the second touch electrode TE2, the second connection electrode BE2, and the strain gage SG may be arranged on the first insulating layer IL1.

The first touch electrodes TE1 may be arranged along the second direction (Y-axis direction), and may be in contact with the first connection electrodes BE1 through a contact hole CTH formed in the first insulating layer IL1. Accordingly, the first touch electrodes TE1 arranged in the second direction (Y-axis direction) are electrically connected to each other. Although it is shown in the drawing that one first connection electrode BE1 is disposed between the first touch electrodes TE1 neighboring along the second direction (Y-axis direction), the number of the first connection electrodes BE1 may be variously changed. When a plurality of first connection electrodes BE1 are disposed between the first touch electrodes TE1, the reliability and stability of the touch sensor can be improved. The first connection electrode BE1 may include a conductive material.

The first touch electrodes TE1 may include a conductive material. Illustratively, the conductive material may include a metal or an alloy thereof. Examples of the metal may include gold (Au), silver (Ag), aluminum (Al), molybdenum (Mo), chromium (Cr), titanium (Ti), nickel (Ni), neodymium (Nd), copper (Cu), and platinum (Pt). Alternatively, the first touch electrodes TE1 may include a transparent conductive material. Examples of the transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nanotube (CNT), and graphene.

The first touch electrode TE1 may have a single-layer structure, or may have a multi-layer structure. When the first touch electrode TE1 has a multi-layer structure, the first touch electrode TE1 may include a plurality of metal layers. Illustratively, the first touch electrode TE1 may have a three-layer structure of titanium/aluminum/titanium.

The second touch electrodes TE2 may be arranged along the first direction (X-axis direction), and may be made of the same material as the first touch electrodes TE1.

The second connection electrodes BE2 may electrically connect the second touch electrodes TE2 arranged along the first direction (X-axis direction), and may be in contact with the second touch electrodes TE2. The second connection electrode BE2 may include a conductive material. The second connection electrode BE2 and the first connection electrode BE1 may be insulated from each other.

The first touch electrodes TE1 and the second touch electrodes TE2 may have a mesh structure in order to transmit light output from the display area DA. When the first touch electrodes TE1 and the second touch electrodes TE2 have a mesh structure, the first touch electrodes TE1 and the second touch electrodes TE2 may be arranged so as not to overlap the light emitting area of the display unit DU. In other words, the first touch electrodes TE1 and second touch electrodes TE2 of the mesh structure may define a mesh hole overlapping the light emitting area. The first connection electrode BE1 and the second connection electrode BE2 may also have a mesh structure. However, the exemplary embodiments are not limited thereto. Only one of the first connection electrode BE1 and the second connection electrode BE2 may have a mesh structure, and each of the first connection electrode BE1 and the second connection electrode BE2 may have a plate shape.

In an exemplary embodiment, the first touch electrodes TE1 and/or the second touch electrodes TE2 may include at least one zigzag-shaped side or at least one serpentine shape. When the first touch electrodes TE1 and/or the second touch electrodes TE2 include at least one zigzag-shaped side, it is possible to prevent or suppress a moire pattern from being seen to a user, and it is possible to improve display failure of the display device due to moiré interference.

The strain gage SG may be located on the first insulating layer ILL and may be disposed on the same layer as the first touch electrodes TE1, the second touch electrodes TE2, and the second connection electrode BE2.

The strain gage SG may include a resistance line 151, a first connection line 153a located at one end of the resistance line 151, and a second connection line 153b located at the other end of the resistance line 151. However, the exemplary embodiments are not limited thereto. As shown in FIG. 7, the strain gauge SG_1 may include a first resistance line 151a and a second resistance line 151b. In this case, the connection lines 153 of the strain gauge SG may include a first connection line 153a located at one end of the first resistance line 151a, a second connection line 153b located at one end of the second resistance line 151b, and a third connection line 153c connecting the other end of the first resistance line 151a and the other end of the second resistance line 151b to each other. Like this, the number and arrangement of the resistance lines 151 and connection lines 153 of the strain gage SG may be varied. Hereinafter, for convenience of explanation, a case where the strain gauge SG includes one resistance line 151 will be described as an example.

The resistance line 151 may be disposed between the touch electrodes TE1 and TE2. For example, the resistance line 151 may be located between the first touch electrodes TE1 in the second direction (Y-axis direction), and may be located between the second touch electrodes TE2 in the first direction (X-axis direction). Further, the resistance line 151 may be spaced apart from the touch electrodes TE1 and TE2, and may be insulated from the touch electrodes TE1 and TE2.

The resistance line 151 may be bent to have a predetermined pattern. For example, when a pressure having a predetermined intensity is applied to the sensor unit 100 of the touch sensor TSM, the length or cross-sectional area of the resistance line 151 is changed, and thus the resistance value of the resistance line 151 is also changed. Thus, the intensity of a touch pressure may be determined based on the changed resistance value.

The resistance line 151 may have a shape including two or more bent portions. However, the exemplary embodiments are not limited thereto, and the resistance line 151 may have various shapes. For example, as shown in FIG. 8, the resistance line 151_1 may have a shape including two or more bent portions and a portion extending in a direction crossing the first direction (X-axis direction) and the second direction (Y-axis direction), as shown in FIG. 9, the first resistance line 151_2 may have a shape including a plurality of bent portions and a portion extending in parallel to the first direction (X-axis direction), as shown in FIG. 10, the first resistance line 151_3 may have an angularly spiral shape, and unlike FIG. 11, the first resistance line 151_3 may have a curvedly spiral shape.

The resistance line 151 may be made of the same material as the touch electrodes TE1 and TE2. For example, the resistance line 151 may include a conductive material. The resistance line 151 may be formed in the same process as the touch electrodes TE1 and TE2 and the second connection electrode BE2.

When the touch electrodes TE1 and TE2 have a mesh structure, the first resistance line 151 may be formed by removing a part of the mesh structure. When the first resistance line 151 is formed by removing a portion of the mesh structure, a plurality of branches BR connected to the first resistance line 151 and spaced apart from each other may be formed as shown in FIG. 11.

The branches BR may be remnants after removing a part of the mesh structure. The branches BR may be spaced apart from the touch electrodes TE1 and TE2. The branches BR may be located on the same layer as the first resistance line 151, and may include the same material as the first resistance line 151.

One end of the connection line 153 may be in direct contact with the resistance line 151, and the other end of the connection line 153 may be connected to the pressure signal line PL. Further, as described above, when a plurality of resistance lines 151 are arranged, the connection line 153_1 may further include a portion for electrically connecting neighboring resistance lines to each other.

The connection line 153 may be disposed on the same layer as the resistance line 151 and the touch electrodes TE1 and TE2, and may include the same material as the resistance line 151 and the touch electrodes TE1 and TE2. For example, the connection line 153 may include a conductive material. Further, the connection line 153 may be formed in the same process as the resistance line 151 and the touch electrodes TE1 and TE2, and may have a mesh structure, similarly to the resistance line 151 and the electrode unit 120.

The second insulating layer IL2 may be disposed on the touch electrodes TE1 and TE2, the second connection electrode BE2 and the strain gauge SG, and may include the same material as the first insulating layer IL1.

Like this, since the touch sensor TSM is configure such that the first touch electrode TE1, the second touch electrode TE2, and the strain gauge SG are located on the same first layer L1, there are an advantage of simultaneously forming the first touch electrode TE1, the second touch electrode TE2, and the strain gauge SG, and an advantage of simplifying a manufacturing process. Further, there is an advantage of implementing a thin film-type touch sensor TSM having a pressure sensing function.

Figure 15:
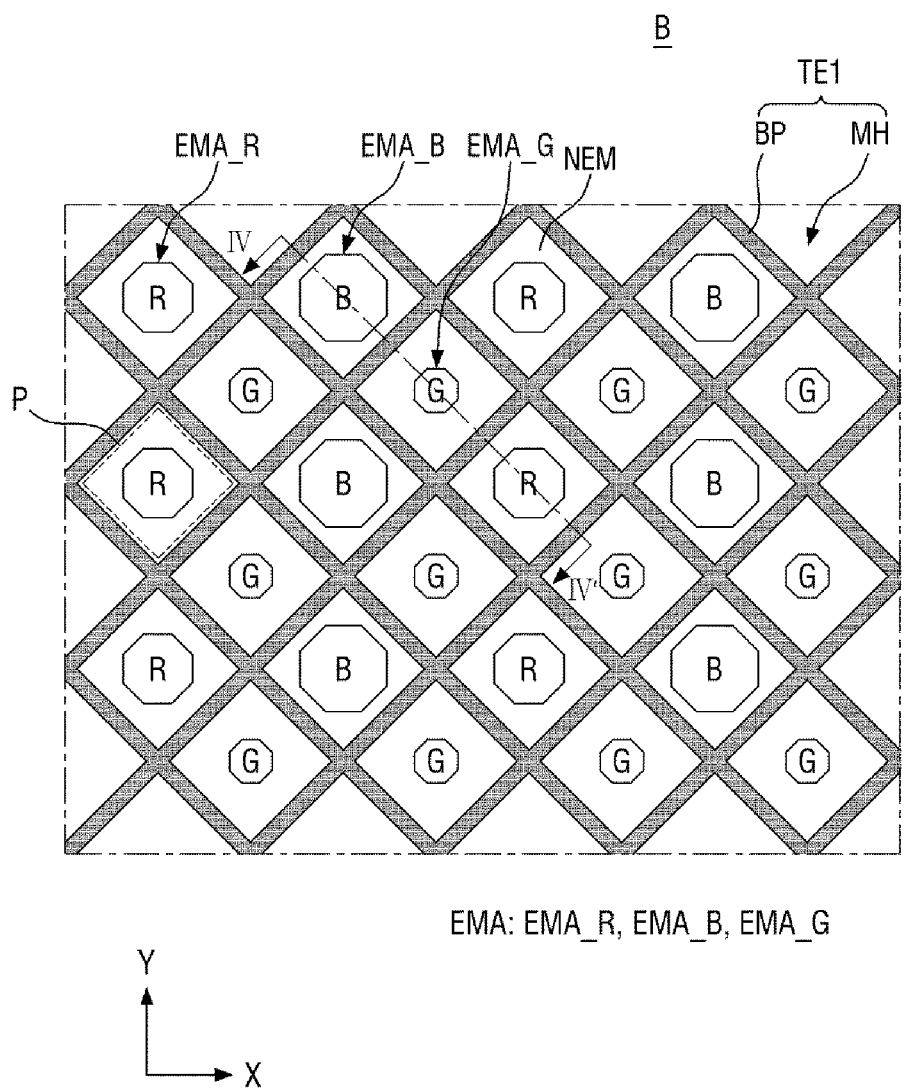
FIG. 15 is an enlarged view of the portion B of FIG. 6.
Figure 16:
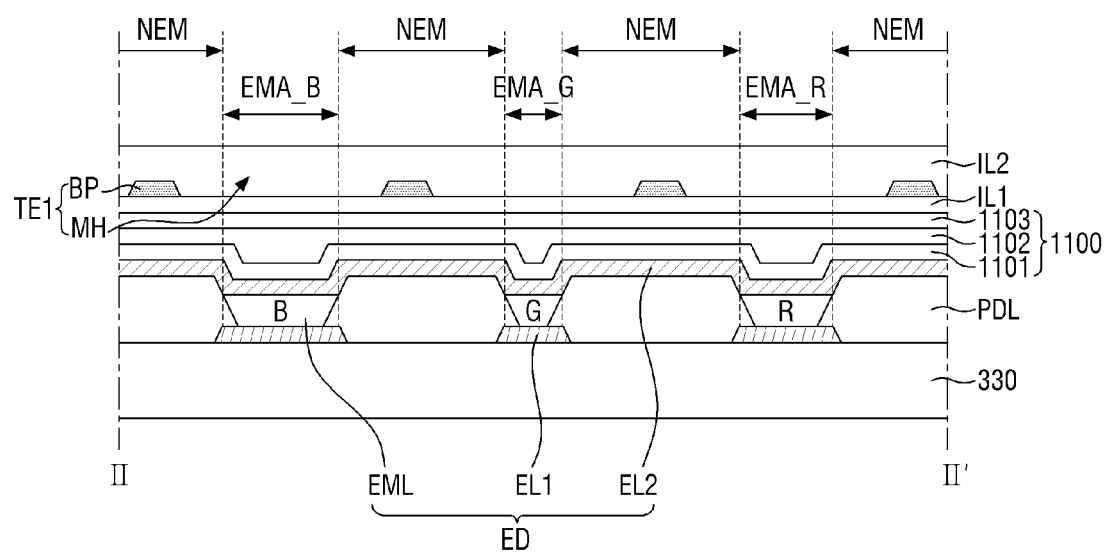
FIG. 16 is a cross-sectional view taken along a sectional line IV-IV' of FIG. 15.

FIG. 15 is an enlarged view of the portion B of FIG. 6, and FIG. 16 is a cross-sectional view taken along the sectional line IV-IV' of FIG. 15.

FIG. 15 is a view for explaining the arrangement relationship of the light emitting areas EMA of the display unit DU and the touch electrodes TE1 and TE2 of the touch sensor TSM. FIG. 15 shows a structure in which the portion B is enlarged in a state where the touch sensor TSM is disposed on the display unit DU, and FIGS. 15 and 16 show an area in which the first touch electrodes TE1 are arranged. However, an area in which the second touch electrodes TE2 are arranged is the same as the area in which the first touch electrodes TE1 are arranged.

Referring to FIG. 15, the display unit DU includes a plurality of pixels P. Each pixel P may include a light emitting area EMA and a non-light emitting area NEM.

The pixel P may include a first color pixel, a second color pixel, and a third color pixel. The respective color pixels P may be arranged in various ways. In an exemplary embodiment, the first color pixels (for example, red pixels) and the second color pixels (for example, blue pixels) are alternately arranged in a first row along the first direction (X axis direction), and the third pixels (for example, green pixels) may be arranged in a second row adjacent to the first row. The pixels belonging to the second row may be arranged to be staggered in the first direction (X-axis direction) with respect to the pixels belonging to the first row. The number of the third color pixels belonging to the second row may be two times the number of the first color pixels or second color pixels belonging to the first row. The arrangement of the first row and the second row may be repeated along the first direction (X-axis direction).

The sizes of the light emitting areas EMA in the respective color pixels P may be different from each other. For example, the light emitting area EMA_B of the second color pixel may be larger than the light emitting area EMA_R of the first color pixel, and the light emitting area EMA_G of the third color pixel may be smaller than the light emitting area EMA_R of the first color pixel.

The shape of the light emitting area EMA of each color pixel P may be a substantially octagonal shape. However, the exemplary embodiments are not limited thereto, and the shape of each light emitting area EMA may be a circular shape, a rhombic shape, a polygonal shape, or a polygonal shape with rounded corners.

As described above, each of the first touch electrodes TE1 may be divided into a mesh hole MH and a body portion BD.

The mesh hole MH may overlap the light emitting area EMA in the thickness direction, and the area of the mesh hole MH may be larger than the area of the light emitting area EMA in the thickness direction. The body portion BD may overlap the non-light emitting area NEM in the thickness direction, and the width of the body portion BD may be smaller than the width of the non-light emitting area NEM. Through such a structure, the light output from the light emitting area EMA of the display unit DU may be effectively transmitted through the first touch electrodes TE1.

Referring to FIG. 16, for each pixel P, a first electrode EL1 is disposed on the base substrate 330. A pixel defining layer PDL exposing the first electrode EL1 may be disposed on the first electrode EL1. The pixel defining layer PDL is disposed in the non-light emitting area NEM.

A light emitting layer EML may be disposed on the first electrode EL1 exposed by the pixel defining layer PDL, and a second electrode EL2 may be disposed on the light emitting layer EML. The second electrode EL2 may be disposed over the entire area without distinguishing the pixels P. The first electrode EL1, the light emitting layer EML, and the second electrode EL2 constitute a light emitting element ED.

A thin film encapsulation layer 1100 including a first inorganic film 1101, an organic film 1102, and a second inorganic film 1103 is disposed on the second electrode EL2, and a first insulating layer ILL a first touch electrode TE1, and a second insulating layer IL2 may be sequentially arranged on the thin film encapsulation layer 1100.

The body portion BP may be disposed to overlap the pixel defining layer PDL, and may be located in the non-light emitting area NEM. That is, since the body portion BP does not overlap the light emitting area EMA, the body portion BP does not interfere with light emission.

Figure 17:
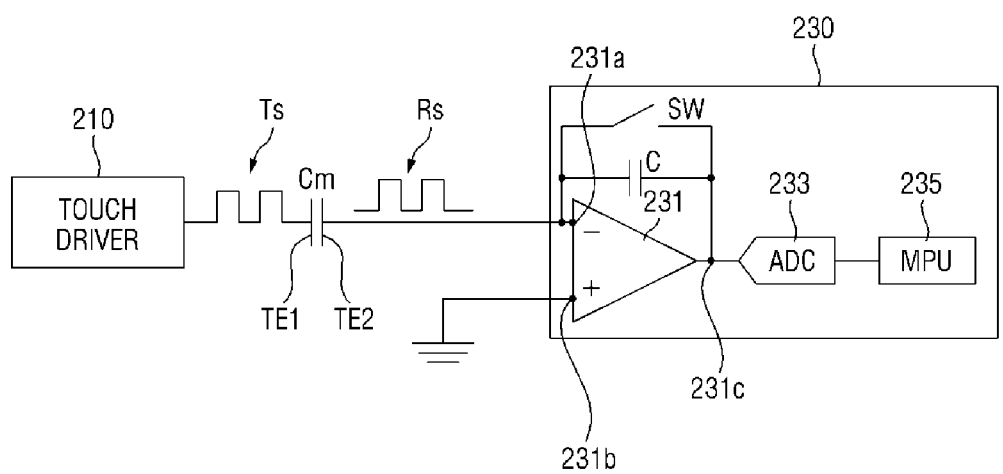
FIG. 17 is a conceptual block diagram for explaining a touch position detecting operation of a touch sensor according to an exemplary embodiment.

FIG. 17 is a conceptual block diagram for explaining a touch position detecting operation of the touch sensor according to an exemplary embodiment.

Referring to FIGS. 5 and 17, the touch driver 210 may provide driving signals Ts to the first touch electrodes TE1 through driving lines TL. The driving signals TS may be sequentially provided to the second touch electrodes TE2.

The touch detector 230 may receive sensing signals Rs from the second touch electrodes TE2 through sensing lines RL. As described above, the sensing signals Rs may include information about a mutual capacitance change generated between the first touch electrodes TE1 and the second touch electrodes TE2. When the driving signals Ts are provided to the first touch electrodes TE1, a mutual capacitance Cm is formed between the first touch electrodes TE1 and the second touch electrodes TE2. In this case, when a touch input occurs, the mutual capacitance Cm is changed, and thus the sensing signals Rs may include information about the aforementioned mutual capacitance change.

The touch detector 230 may include at least one first amplifying circuit 231 such as an operational amplifier, an analog-to-digital converter 233, and a processor 235.

The first amplifying circuit 231 may include a first input terminal 231a, a second input terminal 231b, and an output terminal 231c. According to an exemplary embodiment, the first input terminal 231a of the first amplifying circuit 231, for example, the inverting input terminal of the operational amplifier may be electrically connected to the second touch electrodes through the sensing lines RL, and the sensing signals Rs may be input to the first input terminal 231a.

The second input terminal 231b of the first amplifying circuit 231, for example, the non-inverting input terminal of the operational amplifier is a reference potential terminal, and may be connected to a reference power source as an example. In some exemplary embodiments, the reference power source may be a ground (GND) power source. However, the exemplary embodiments are not limited thereto. When the sensor unit 100 includes a noise sensing electrode unit, the second input terminal 231b may be electrically connected to the noise sensing electrode unit.

When the sensor unit 100 includes the noise sensing electrode unit, the touch sensor TSM may effectively offset noise signals received from the display unit DU and the like, and my improve a signal-to-noise ratio (SNR). Accordingly, malfunction of the touch sensor TSM according to the noise signals can be minimized, and sensing sensitivity can be improved.

In some exemplary embodiments, a capacitor C and a reset switch SW may be connected in parallel between the first input terminal 231a and output terminal 231c of the first amplifying circuit 231.

Meanwhile, although it is described in the above example that the first amplifying circuit 231 is implemented in the form of an inverting amplifying circuit, the exemplary embodiments are not limited thereto. In another exemplary embodiment, the first amplifying circuit 231 may be implemented in the form of a non-inverting amplifying circuit or the like.

The output terminal 231c of the first amplifying circuit 231 may be electrically connected to the analog-to-digital converter 233.

The analog-to-digital converter 233 may convert the input analog signal into a digital signal. According to an exemplary embodiment, the analog-to-digital converter 233 may be provided as many as the number of the second touch electrodes TE2 so as to correspond to each of the second touch electrodes TE2 in a one-to-one correspondence. Alternatively, in another exemplary embodiment, each of the second touch electrodes TE2 may be configured to share one analog-to-digital converter 233, and in this case, a switching circuit for channel selection may be additionally provided.

The processor 235 processes the converted signal (digital signal) from the analog-to-digital converter 233 and detects a touch input according to the signal processing result. For example, the processor 235 may comprehensively analyze the sensing signals amplified by the first amplifying circuit 231 and converted by the analog-to-digital converter 233 to detect whether or not the touch input is generated and detect the position of the touch input. According to an exemplary embodiment, the processor 235 may be implemented as a microprocessor (MPU). In this case, a memory required for driving the processor 235 may be additionally provided in the touch detector 230. Meanwhile, the configuration of the processor 235 is not limited thereto. As another example, the processor 235 may be implemented as a microcontroller (MCU) or the like.

Figure 18:
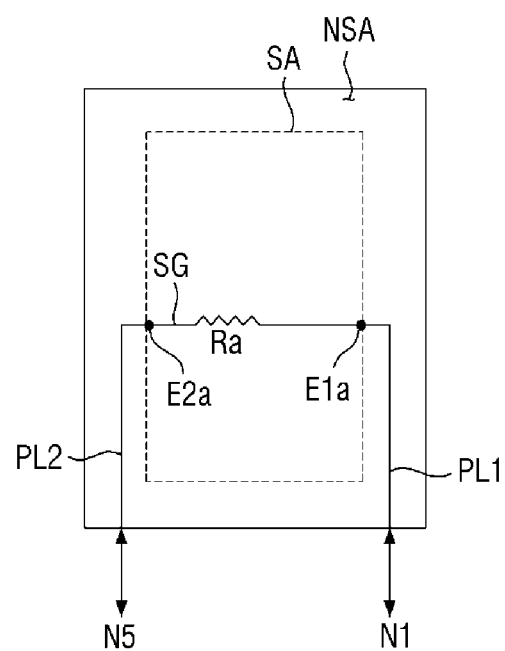
FIG. 18 is a schematic diagram of the arrangement of a strain gauge and pressure signal lines of a touch sensor according to an exemplary embodiment and the connection relationship with a Wheatstone bridge circuit unit.
Figure 19:
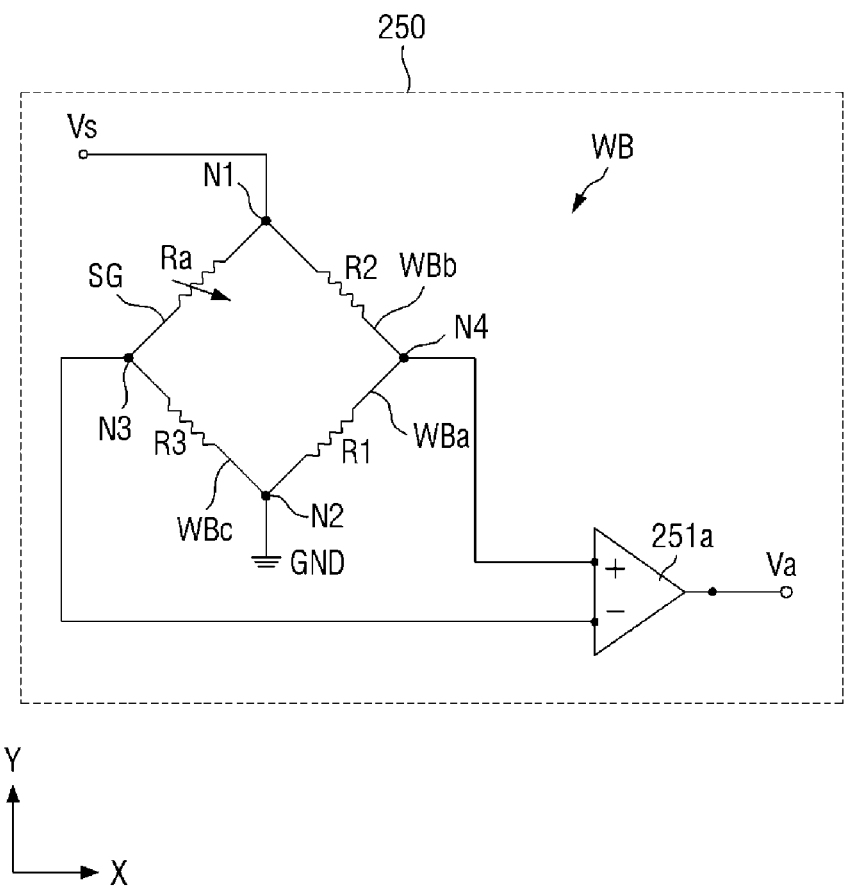
FIG. 19 is a schematic diagram of a pressure detector including a Wheatstone bridge circuit unit electrically connected to a strain gauge of a touch sensor according to an exemplary embodiment.

FIG. 18 is a schematic diagram of the arrangement of a strain gauge and pressure signal lines of a touch sensor according to an exemplary embodiment and the connection relationship with a Wheatstone bridge circuit unit, and FIG. 19 is a schematic diagram of a pressure detector including a Wheatstone bridge circuit unit electrically connected to a strain gauge of a touch sensor according to an exemplary embodiment.

Referring to FIGS. 18 and 19, the strain gauge SG may include one end E1a and the other end E2a that are located opposite to each other along the first direction (X-axis direction). As described above, one end E1a of the strain gage SG may be connected to the first pressure signal line PL1, and the other end E2a of the strain gauge SG may be connected to the second pressure signal line PL2.

For convenience of explanation, although one strain gauge SG is illustrated in these drawings, as described above, a plurality of strain gauges SG may be arranged on the sensing area SA. That is, a Wheatstone bridge circuit unit WB electrically connected to the strain gages SG may also be provided on the controller 200 by the number corresponding to the number of the arranged strain gauges SG.

As one end E1a and the other end E2a of the strain gauge SG are located opposite to each other, the first pressure signal line PL1 and the second pressure signal line PL2 may also be located opposite to each other with the sensing area SA therebetween.

The pressure detector 250 may include a Wheatstone bridge circuit unit WB. The pressure detector 250 may further include an analog-to-digital converter for detecting the first voltage Va output from the Wheatstone bridge circuit unit WB, and a processor.

The Wheatstone bridge circuit unit WB includes a first node N1, a second node N2, a first output node N3, and a second output node N4. A driving voltage Vs may be provided to the first node N1, and the second node N2 may be connected to the ground GND.

The Wheatstone bridge circuit unit WB may further include a first resistor WBa connected to the second node N2 and the second output node N4, a second resistor WBb connected to the first node N1 and the second output node N4, and a third resistor WBc connected to the second node N2 and the first output node N3.

The resistance value R1 of the first resistor WBa, the resistance value R2 of the second resistor WBb, and the resistance value R3 of the third resistor WBc may have predetermined values. That is, the first to third resistors WBa to WBc may be fixed resistors.

The Wheatstone bridge circuit unit WB may further include a second amplifying circuit 251a such as an operational amplifier. The second amplifying circuit 251a may include an inverting input terminal, a non-inverting input terminal, and an output terminal. The second amplifying circuit 251a may sense a electric flow between the first output node N3 and the second output node N4. That is, the second amplifying circuit 251a may be operated by a current detecting element or a voltage measuring element.

Any one of the first output node N3 and the second output node N4 may be electrically connected to any one of the input terminals of the second amplifying circuit 251a, and the other one of the first output node N3 and the second output node N4 may be electrically connected to the other input terminal of the second amplifying circuit 251a. For example, the first output node N3 may be connected to the inverting input terminal of the second amplifying circuit 251a, and the second output node N4 may be connected to the non-inverting input terminal of the second amplifying circuit 251a.

The output terminal of the second amplifying circuit 251a may output a first voltage Va proportional to a difference between the voltage values input to the both input terminals.

One end E1a of the strain gage SG may be electrically connected to the first node N1 through the first pressure signal line PL1, and the other end E2a of the strain gage SG may be connected to the first output node N3 through the second pressure signal line PL2.

According to the exemplary embodiment, the strain gage SG, the first resistor WBa, the second resistor WBb, and the third resistor WBc may be connected to each other to implement the Wheatstone bridge circuit unit WB.

The product of the resistance value Ra of the strain gauge SG and the resistance value R1 of the first resistor WBa in the state where the touch input is not applied may be substantially the same as the product of the resistance value R2 of the second resistor WBb and the resistance value R3 of the third resistor WBc.

Like this, when the product of the resistance value Ra of the strain gauge SG and the resistance value R1 of the first resistor WBa is the same as the product of the resistance value R2 of the second resistor WBb and the resistance value R3 of the third resistor WBc, the voltages of the first output node N3 and the second output node N4 may be equal to each other. When the voltages of the first output node N3 and the second output node N4 are equal to each other, a voltage difference between the first output node N3 and the second output node N4 may be 0 V, and the first voltage Va output from the second amplifying circuit 251a may be 0 V.

When a touch input is applied to the sensor unit 100, the shape of the strain gauge SG may be deformed according to the intensity of a touch, the resistance value Ra of the strain gauge SG may be changed by the shape deformation, and thus a voltage difference may be generated between the first output node N3 and the second output node N4. When a voltage difference is generated between the first output node N3 and the second output node N4, the second amplifying circuit 251a may output a value of other than 0 V as the first voltage Va, and the touch sensor may measure this value to detect the intensity or pressure of the touch.

Figure 20:
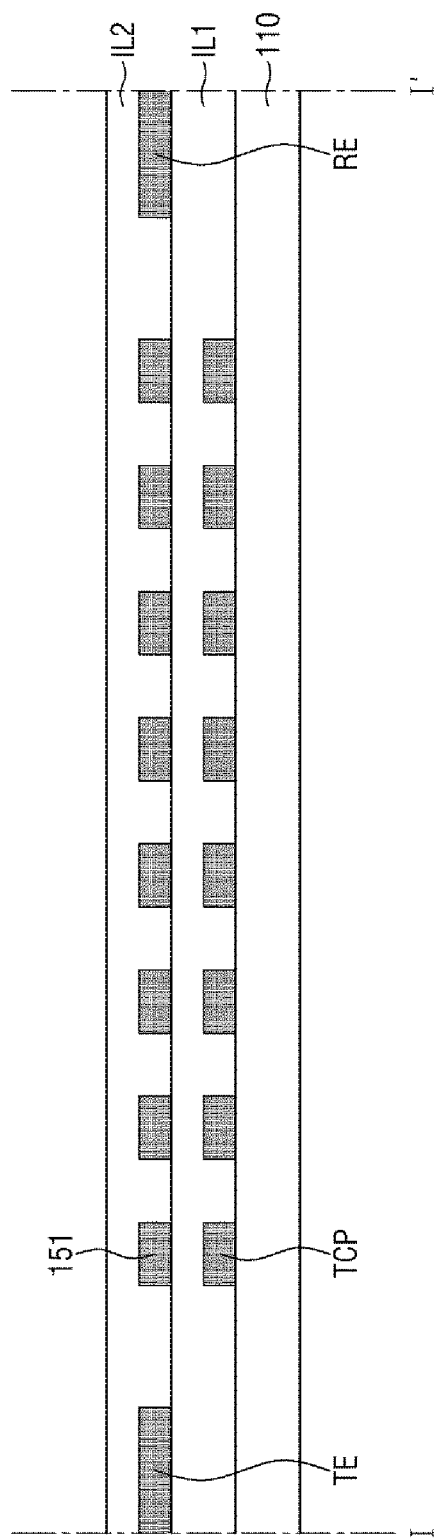
FIG. 20 is a cross-sectional view of a touch sensor according to another exemplary embodiment.
Figure 21:
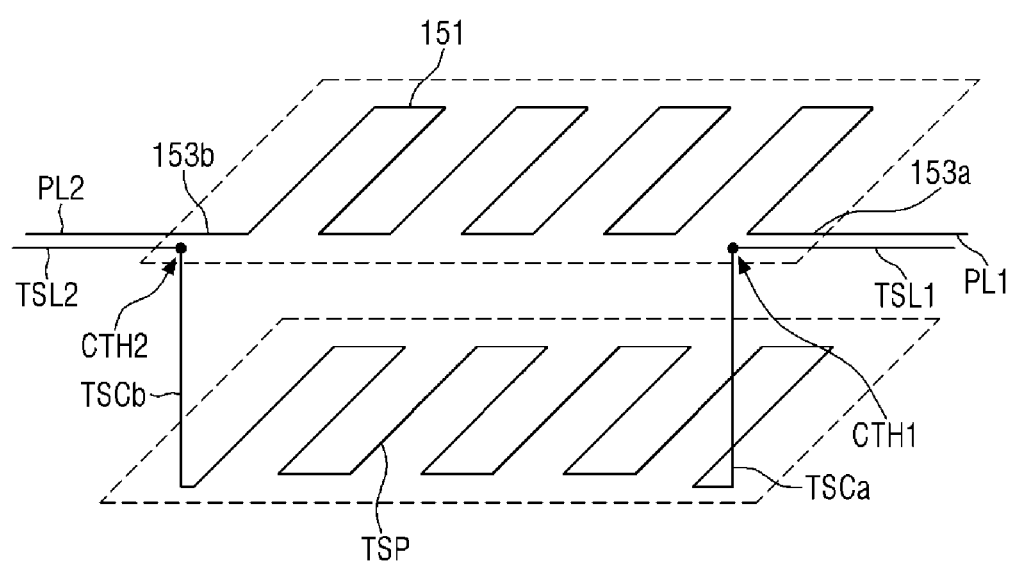
FIG. 21 is a schematic diagram of the arrangement relationship of a strain gauge and a temperature compensation pattern of a touch sensor according to another exemplary embodiment.

FIG. 20 is a cross-sectional view of a touch sensor according to another exemplary embodiment, and FIG. 21 is a schematic diagram of the arrangement relationship of a strain gauge and a temperature compensation pattern of a touch sensor according to another exemplary embodiment. The exemplary embodiment of FIGS. 20 and 21 is different from the exemplary embodiment of FIGS. 1, 2, 3, 4, 5, 6, 7, 8, 9, 10, 11, 12, 13, 14, 15, 16, 17, 18, and 19 in that the touch sensor TSM further includes a temperature compensation pattern PCT. Hereinafter, a description overlapping the exemplary embodiment of FIGS. 1, 2, 3, 4, 5, 6, 7, 8, 9, 10, 11, 12, 13, 14, 15, 16, 17, 18, and 19 will be omitted, and differences will be mainly described.

Referring to FIGS. 20 and 21, a temperature compensation unit TRM may be disposed under the strain gauge SG. The temperature compensation unit TRM may include a temperature compensation pattern TSP and a temperature compensation connection line TSC.

The temperature compensation pattern TSP may be disposed corresponding to the resistance line 151 of the strain gage SG. For example, the temperature compensation pattern TSP may overlap the resistance line 151 of the strain gage SG in the thickness direction.

The temperature compensation pattern TSP may have the same shape as the resistance line 151 of the strain gauge 150. For example, the temperature compensation pattern TSP may be bent to have a predetermined pattern corresponding to the resistance line 151. The temperature compensation pattern TSP may be made of the same material as the resistance line 151. However, the shape of the temperature compensation pattern TSP may be different from that of the resistance line 151. Even when the shape of the temperature compensation pattern TSP is different from that of the resistance line 151, the resistance value of the temperature compensation pattern TSP may be the same as that of the resistance line 151.

The temperature compensation pattern TSP may be disposed between the base layer 110 and the first insulating layer IL1. The first insulating layer IL1 may include a first contact hole CTH1 and a second contact hole CTH2.

The temperature compensation connection line TSC includes a first temperature compensation connection line TSCa connected to one end of the temperature compensation pattern TSP and a second temperature compensation connection line TSCb connected to the other end of the temperature compensation pattern TSP. The first temperature compensation connection line TSCa may extend in the third direction (Z-axis direction), and may be electrically connected to the first temperature compensation line TSL1 through the first contact hole CTH1, and the second temperature compensation connection line TSCb may extend in the third direction (Z-axis direction), and may be electrically connected to the second temperature compensation line TSL2 through the second contact hole CTH2. Accordingly, one end of the temperature compensation pattern TSP may be electrically connected to the first temperature compensation line TSL1, and the other end of the temperature compensation pattern TSP may be electrically connected to the second temperature compensation line TSL2. The temperature compensation lines TSL1 and TSL2 may be connected to the second pad unit ('TP2' in FIG. 4) to transmit signals to the controller ('200' in FIG. 4). Through such a structure, it is possible to easily avoid a contact with the first connection electrode ('BE1' in FIG. 12) disposed on the same layer, thereby providing design convenience. However, the exemplary embodiments are not u) limited thereto. In some exemplary embodiments, The temperature-compensating connection line TSC may be disposed between the base layer 110 and the first insulating layer ILL and may be connected to the first temperature compensation line TSL1 and the second temperature compensation line TSL2 in such a manner as to bypass the first connection electrode ('BE1' in FIG. 12).

Referring to FIGS. 1, 2, 3, 4, 5, and 6 together, when a user's touch input is applied to the touch sensor TSM, the resistance value of the strain gauge SG may be changed depending on the intensity of the touch input. In addition, the resistance value of the strain gauge SG may be changed depending on the temperature of a user's body or the temperature change caused by the underlying display unit DU. Therefore, the change in resistance value of the strain gauge SG based on the temperature change, among the changes in resistance value of the strain gauge SG, is independent of the intensity of the user's touch input, and thus this change may act as noise.

According to the exemplary embodiment, the temperature compensation pattern TSP is disposed under the resistance line 151 of the strain gauge SG to overlap the resistance line 151 of the strain gauge SG. Thus, when the user's touch input is applied to the touch sensor TSM, the resistance value of the strain gauge SG is changed depending on the temperature change caused by the user's body temperature and the underlying display unit DU, and the resistance value of the temperature compensation pattern TSP is changed depending on the heat transfer caused by the user's body temperature and the underlying display unit DU. Therefore, the component based on the temperature change in the resistance value change of the strain gage SG may be compensated by using the resistance value change generated based on the temperature change in the temperature compensation pattern TSP.

Figure 22:
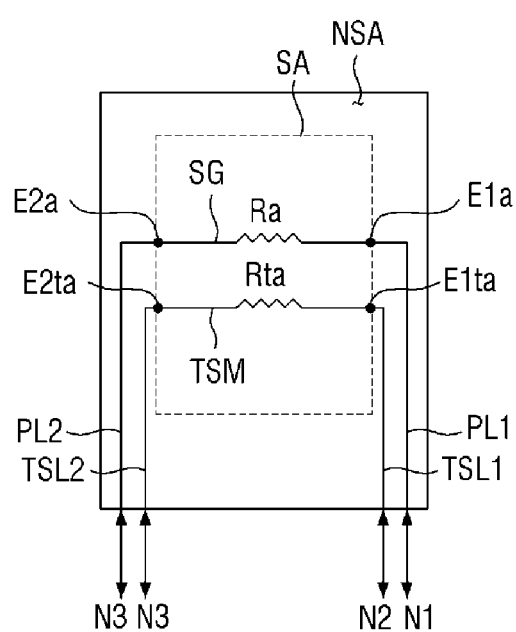
FIG. 22 is a schematic diagram of the arrangement of a strain gauge, a temperature compensation pattern and temperature compensation lines of a touch sensor according to another exemplary embodiment and the connection relationship with a Wheatstone bridge circuit unit.
Figure 23:
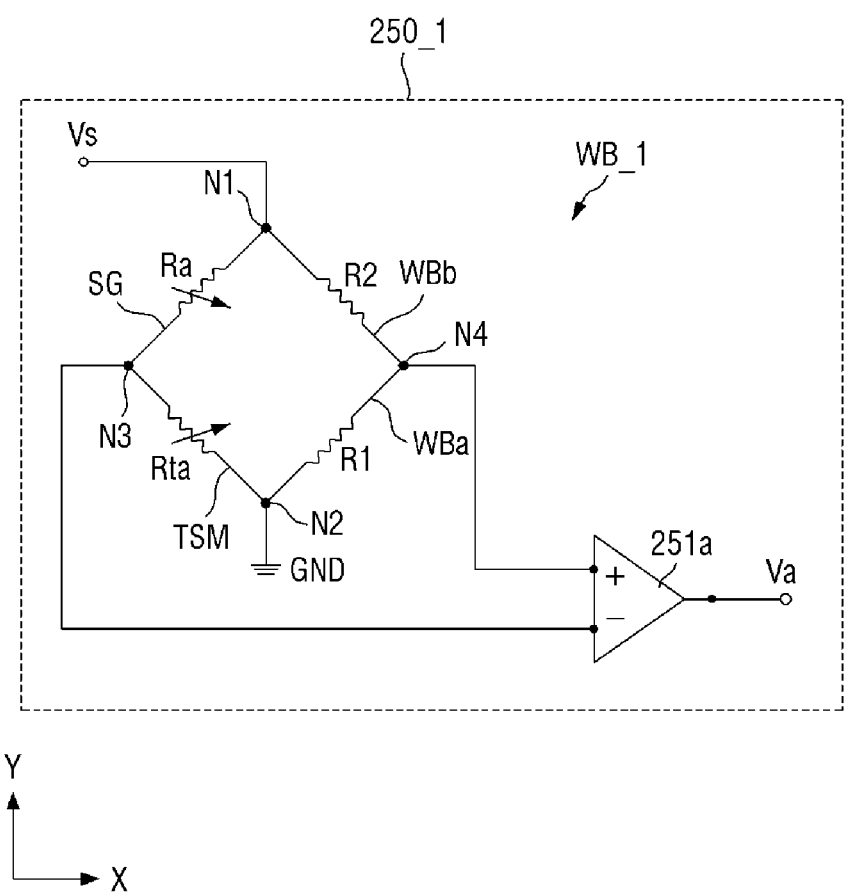
FIG. 23 is a schematic diagram of a Wheatstone bridge circuit unit electrically connected to a strain gauge and a temperature compensation pattern of a touch sensor according to still another exemplary embodiment.

FIG. 22 is a schematic diagram of the arrangement of a strain gauge, a temperature compensation pattern and temperature compensation lines of a touch sensor according to another exemplary embodiment and the connection relationship with a Wheatstone bridge circuit unit, and FIG. 23 is a schematic diagram of a Wheatstone bridge circuit unit electrically connected to a strain gauge and a temperature compensation pattern of a touch sensor according to still another exemplary embodiment. The exemplary embodiment of FIGS. 22 and 23 is different from the exemplary embodiment of FIGS. 18 and 19 in that the Wheatstone bridge circuit part WB_1 of the pressure detector 250_1 includes a temperature compensation pattern TSP. Hereinafter, a description overlapping the exemplary embodiment of FIGS. 18 and 19 will be omitted, and differences will be mainly described.

One end E1a of the strain gage SG may be electrically connected to the first node N1 through the first pressure signal line PL1, and the other end E2a of the strain gage SG may be connected to the first output node N3 through the second pressure signal line PL2.

One end E1ta of the first temperature compensation pattern TSP may be connected to the second node N2 through the first temperature compensation line TSL1, and the other end E2ta of the first temperature compensation pattern TSP may be connected to the first output node N3 through the second temperature compensation line TSL2. The strain gauge SG, the temperature compensation pattern TSP, the first resistor WBa, and the second resistor WBb may be connected to each other to constitute a Wheatstone bridge.

In some exemplary embodiments, the product of the resistance value Ra of the strain gauge SG and the resistance value R1 of the first resistor WBa in the state where the touch input is not applied may be substantially the same as the product of the resistance value Rta of the temperature compensation pattern TSP and the resistance value R2 of the second resistor WBb.

When a touch input occurs, the resistance value Ra of the strain gauge SG includes a component (hereinafter, referred to as a 'first pressure resistance component') that changes in shape due to a touch pressure and a component (hereinafter referred to as a 'first temperature resistance component') that changes in shape based on a temperature change. Further, when the touch input occurs, the resistance value Rta of the temperature compensation pattern TSP includes a component (hereinafter, referred to as a 'second pressure resistance component') that changes in shape due to a touch pressure and a component (hereinafter referred to as a 'second temperature resistance component') that changes in shape based on a temperature change. The second pressure resistance component may be negligible, or may exhibit a significant difference from the first pressure resistance component. Since the strain gauge SG and the temperature compensation pattern TSP are not arranged to face each other in a diagonal direction in the Wheatstone bridge circuit unit, the second temperature resistance component of the temperature compensation pattern TSP may compensate or offset the first temperature resistance component of the strain gage SG, and thus the touch pressure may be detected more sensitively.

FIGS. 24, 25, 26, 27, and 28 are schematic diagrams of modified examples of the shape of a touch sensor and the layout of a pressure sensor area.

Figure 24:
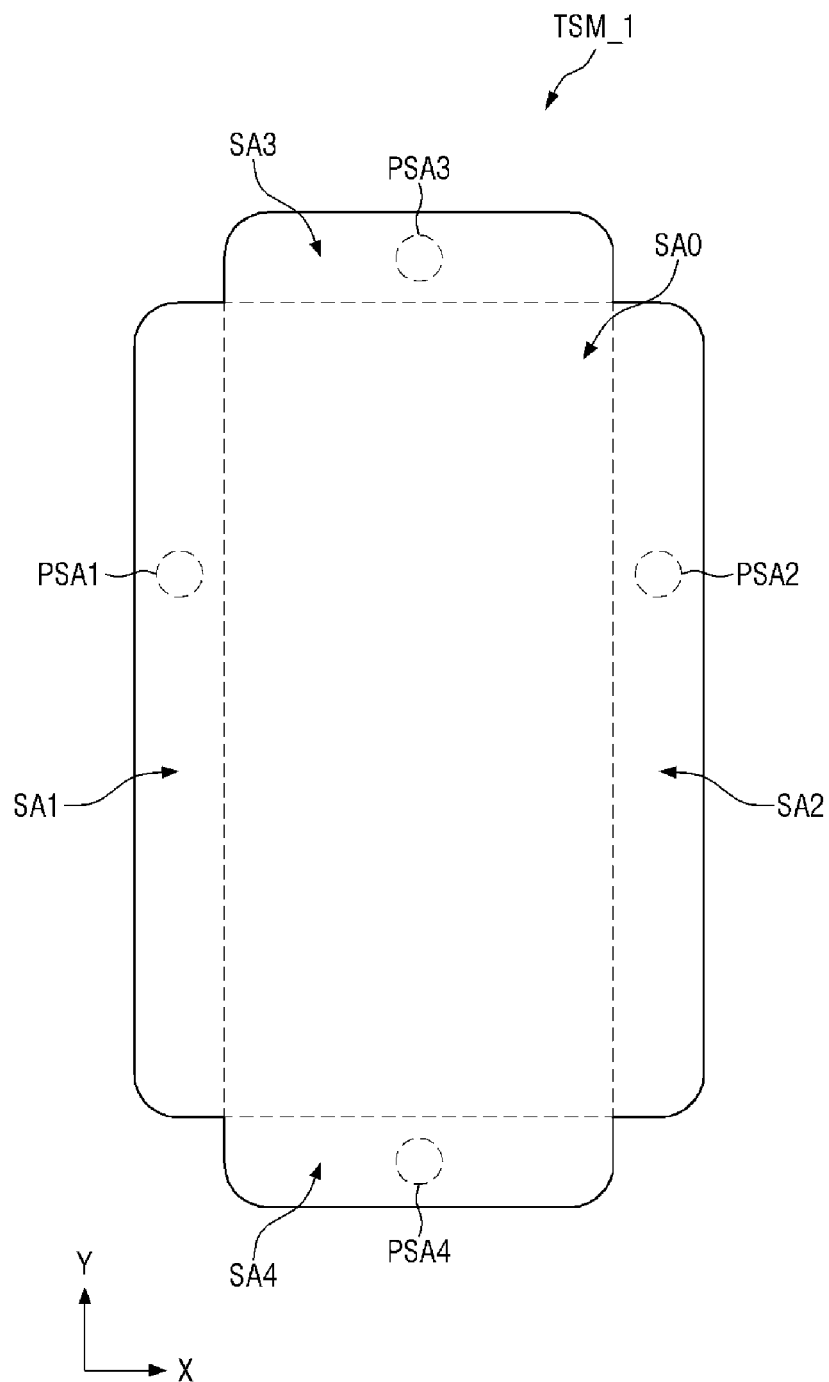
FIGS. 24, 25, 26, 27, and 28 are schematic diagrams of modified examples of the shape of a touch sensor and the layout of a pressure sensor area.

Referring to FIG. 24, the sensing area SA of a touch sensor TSM_1 may include a main sensing area SA0 and first to fourth sub-sensing areas SA1, SA2, SA3, and SA4.

The main sensing area SA0 may correspond to the main display area DA0 of the display unit DU. Each of the first to fourth sub-sensing areas SA1, SA2, SA3, and SA4 may be connected to the main sensing area SA0. For example, the first sub-sensing area SA1 and the second sub-sensing area SA2 may respectively extend from the long sides of the main sensing area SA0 and face each other in the first direction (X-axis direction) with the main sensing area SA0 therebetween, and the third sub-sensing area SA3 and the fourth sub-sensing area SA4 may respectively extend from the short sides of the main sensing area SA0 and face each other in the second direction (Y-axis direction) with the main sensing area SA0 therebetween.

A first pressure sensing area PSA1, a second pressure sensing area PSA2, a third pressure sensing area PSA3, and a fourth pressure sensing area PSA4 may be arranged in the first to fourth sub-sensing areas SA1, SA2, SA3, and SA4, respectively. For example, the first pressure sensing area PSA1 may be disposed in the first sub-sensing area SA1, the second pressure sensing area PSA2 may be disposed in the second sub-sensing area SA2, the third pressure sensing area PSA3 may be disposed in the third sub-sensing area SA3, and the fourth pressure sensing area PSA4 may be disposed in the fourth sub-sensing area SA4.

Although it is shown in FIG. 24 that each of the first to fourth pressure sensing areas has a circular shape, the exemplary embodiments are not limited thereto, and each of the first to fourth pressure sensing areas PSA1, PSA2, PSA3, and PSA4 may have various shapes such as an ellipse and a polygon. In some exemplary embodiments, the first to fourth pressure sensing areas PSA1, PSA2, PSA3, and PSA4 may have different areas. In an exemplary embodiment, the touch sensing area is provided with the main sensing area SA0 and the first to fourth sub-sensing areas SA1, SA2, SA3, and SA4 other than the first to fourth pressure sensing areas PSA1, PSA2, PSA3, and PSA4, the presence or absence of a touch by a user and the position of the touch may be detected. Further, the first to fourth pressure sensing areas PSA1, PSA2, PSA3, and PSA4 are arranged in the first to fourth sub-sensing areas SA1, SA2, SA3, and SA4, and the strain gauge SG is disposed in each of the first to fourth pressure sensing areas PSA1, PSA2, PSA3, and PSA4, thereby sensing a touch pressure.

Figure 25:
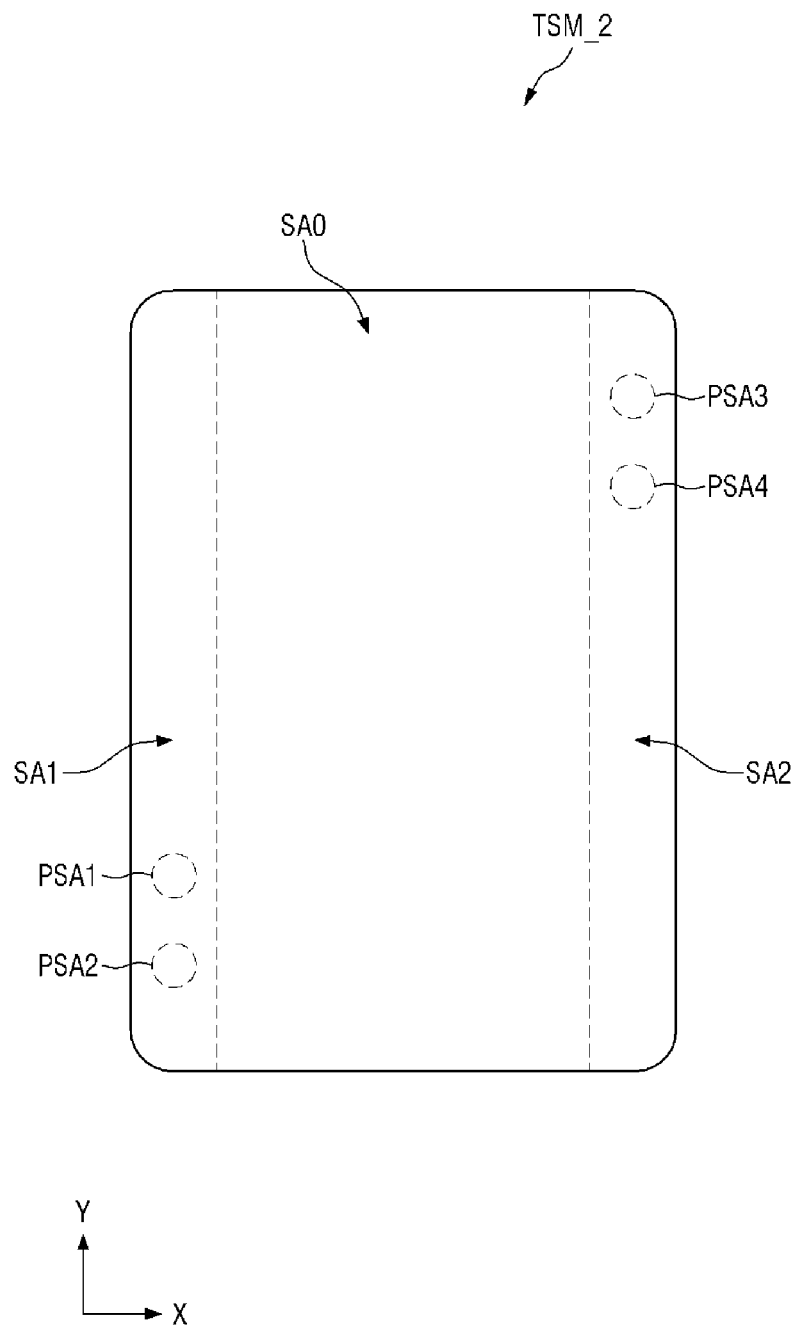

Referring to FIG. 25, the sensing area SA of a touch sensor TSM_2 may include a main sensing area SA0 and first and second sub-sensing areas SA1 and SA2.

The main sensing area SA0 may correspond to the main display area DA0 of the display unit DU. Each of the first and second sub-sensing areas SA1 and SA2 may be connected to the main sensing area SA0. For example, the first sub-sensing area SA1 and the second sub-sensing area SA2 may respectively extend from the long sides of the main sensing area SA0 and face each other in the first direction (X-axis direction) with the main sensing area SA0 therebetween.

First to fourth pressure sensing areas PSA1, PSA2, PSA3, and PSA4 may be arranged in the first and second sub-sensing areas SA1 and SA2. For example, the first pressure sensing area PSA1 and the second pressure sensing area PSA2 may be disposed in the first sub-sensing area SA1, and the third pressure sensing area PSA3 and the fourth pressure sensing area PSA4 may be disposed in the second sub-sensing area SA2. The first pressure sensing area PSA1 and the second pressure sensing area PSA2 may not overlap the third pressure sensing area PSA3 and the fourth pressure sensing area PSA4 in the first direction (X-axis direction). However, the exemplary embodiments are not limited thereto, and the first pressure sensing area PSA1 and the second pressure sensing area PSA2 may partially overlap the third pressure sensing area PSA3 and the fourth pressure sensing area PSA4 in the first direction (X-axis direction).

The touch sensing area is provided with the main sensing area SA0 and the first and second sub-sensing areas SA1 and SA2 other than the first and second pressure sensing areas PSA1 and PSA2, the presence or absence of a touch by a user and the position of the touch may be detected. Further, the first and second pressure sensing areas PSA1 and PSA2 are arranged in the first and second sub-sensing areas SA1 and SA2, and the strain gauge SG is disposed in each of the first and second pressure sensing areas PSA1 and PSA2, thereby sensing a touch pressure.

Figure 26:
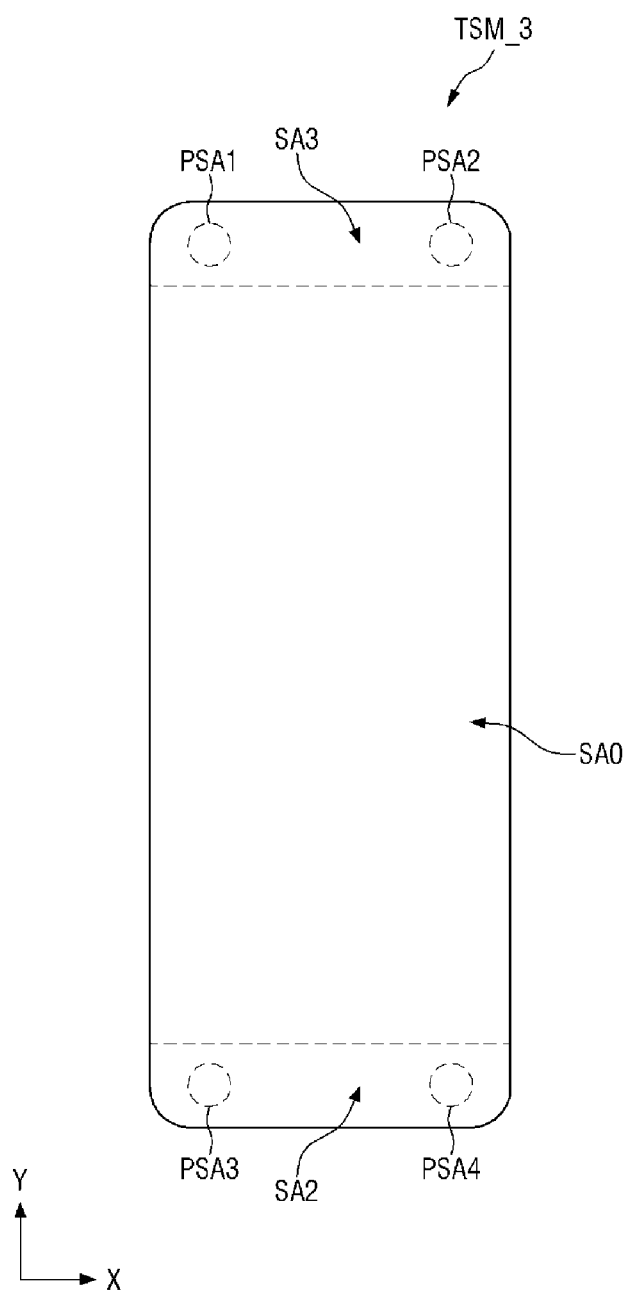

Referring to FIG. 26, the sensing area SA of a touch sensor TSM_3 may include a main sensing area SA0 and first and second sub-sensing areas SA1 and SA2.

The main sensing area SA0 may correspond to the main display area DA0 of the display unit DU. Each of the first and second sub-sensing areas SA1 and SA2 may be connected to the main sensing area SA0. For example, the first sub-sensing area SA1 and the second sub-sensing area SA2 may respectively extend from the short sides of the main sensing area SA0 and face each other in the second direction (Y-axis direction) with the main sensing area SA0 therebetween.

First to fourth pressure sensing areas PSA1, PSA2, PSA3, and PSA4 may be arranged in the first and second sub-sensing areas SA1 and SA2. For example, the first pressure sensing area PSA1 and the second pressure sensing area PSA2 may be disposed in the first sub-sensing area SA1, and the third pressure sensing area PSA3 and the fourth pressure sensing area PSA4 may be disposed in the second sub-sensing area SA2. The first pressure sensing area PSA1 and the second pressure sensing area PSA2 may overlap the third pressure sensing area PSA3 and the fourth pressure sensing area PSA4 in the second direction (Y-axis direction). However, the exemplary embodiments are not limited thereto, and the first pressure sensing area PSA1 and the second pressure sensing area PSA2 may not overlap the third pressure sensing area PSA3 and the fourth pressure sensing area PSA4 in the second direction (Y-axis direction). The first pressure sensing area PSA1 and the second pressure sensing area PSA2 may be disposed to be adjacent to both ends of the first sub-sensing area SA1 and spaced apart from each other in the first direction (X-axis direction), and the third pressure sensing area PSA3 and the fourth pressure sensing area PSA4 may be disposed to be adjacent to both ends of the second sub-sensing area SA2 and spaced apart from each other in the first direction (X-axis direction). The strain gauge SG is disposed in each of the first to fourth pressure sensing areas PSA1, PSA2, PSA3, and PSA4, thereby sensing a touch pressure.

Figure 27:
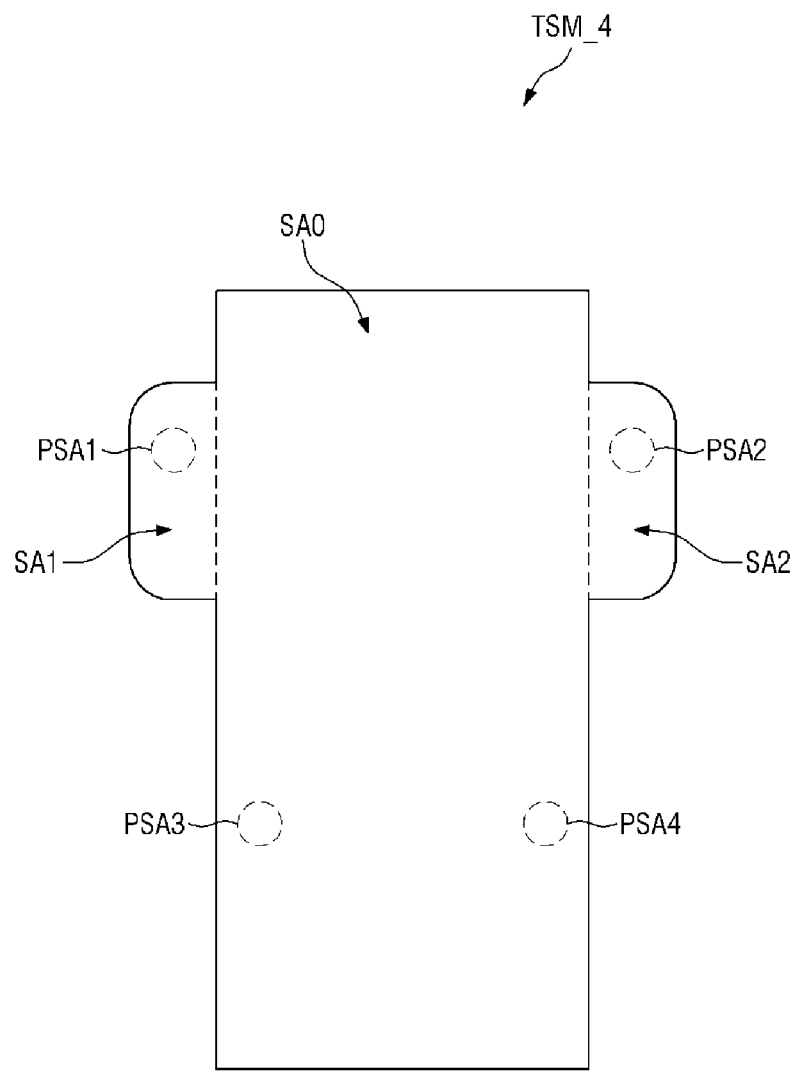

Referring to FIG. 27, the sensing area SA of a touch sensor TSM_4 may include a main sensing area SA0 and first and second sub-sensing areas SA1 and SA2.

Each of the first and second sub-sensing areas SA1 and SA2 may be connected to the main sensing area SA0, and may be a portion extending from a part of a long side of the main sensing area SA0. For example, the first sub-sensing area SA1 and the second sub-sensing area SA2 may respectively extend from the long sides of the main sensing area SA0 and face each other in the first direction (X-axis direction) with the main sensing area SA0 therebetween.

First and second pressure sensing areas PSA1 and PSA2 may be arranged in the first and second sub-sensing areas SA1 and SA2. For example, the first pressure sensing area PSA1 may be disposed in the first sub-sensing area SA1, and the second pressure sensing area PSA2 may be disposed in the second sub-sensing area SA2. The first pressure sensing area PSA1 and the second pressure sensing area PSA2 may overlap each other in the first direction (X-axis direction). However, the exemplary embodiments are not limited thereto, and the first pressure sensing area PSA1 and the second pressure sensing area PSA2 may partially overlap each other in the first direction (X-axis direction). The strain gauge SG is disposed in each of the first to fourth pressure sensing areas PSA1, PSA2, PSA3, and PSA4, thereby sensing a touch pressure.

Figure 28:
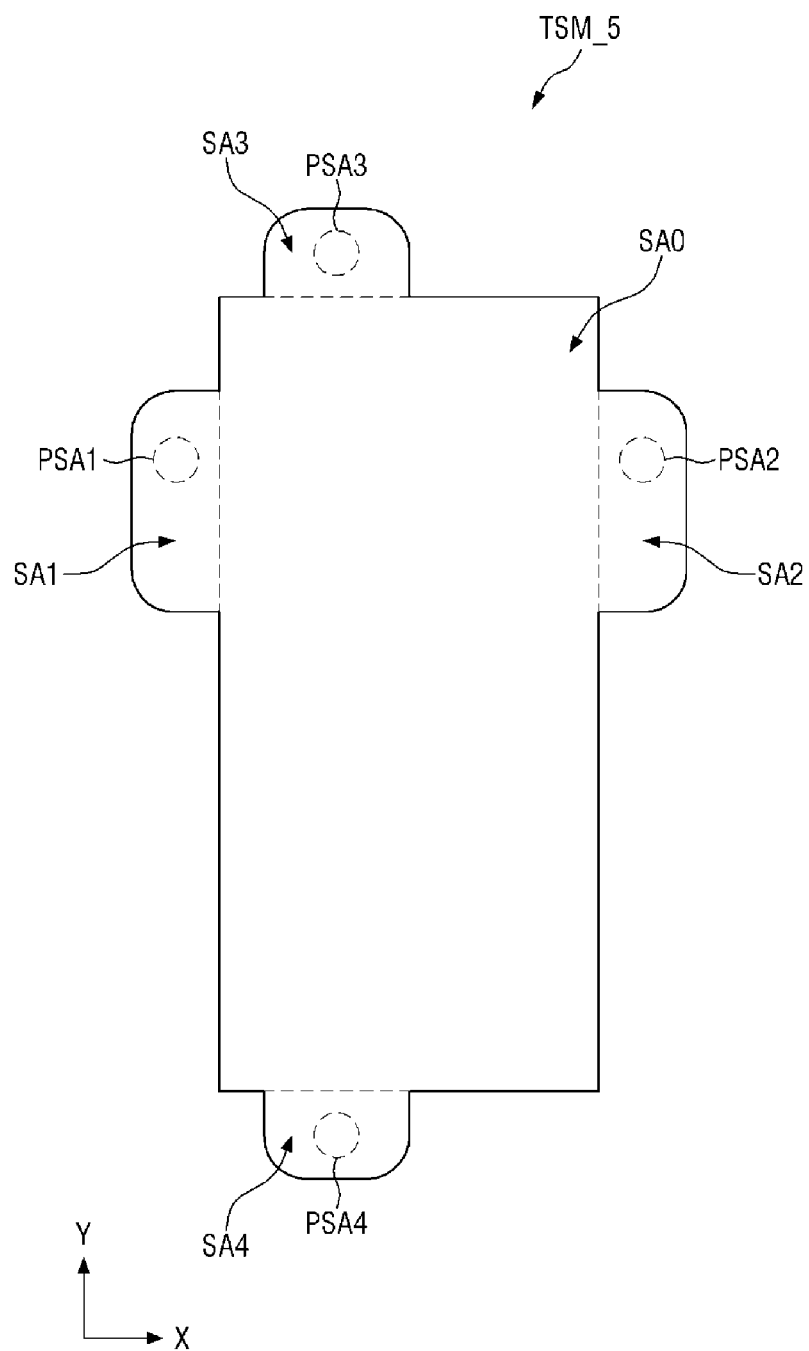

Referring to FIG. 28, the sensing area SA of a touch sensor TSM_5 may include a main sensing area SA0 and first to fourth sub-sensing areas SA1, SA2, SA3, and SA4.

The first to fourth sub-sensing areas SA1, SA2, SA3, and SA4 may be respectively connected to the main sensing area SA0, and may be portions extending from a part of a long side and a part of a short side of the main sensing area SA0. For example, each of the first sub-sensing area SA1 and the second sub-sensing area SA2 may extend from the long side of the main sensing area SA0, and may have a length shorter than that of the long side in the second direction (Y-axis direction). Further, each of the third sub-sensing area SA3 and the fourth sub-sensing area SA4 may extend from the short side of the main sensing area SA0, and may have a length shorter than that of the short side in the first direction (X-axis direction).

First to fourth pressure sensing areas PSA1, PSA2, PSA3, and PSA4 may be arranged in the first to fourth sub-sensing areas SA1, SA2, SA3, and SA4, respectively. For example, the first pressure sensing area PSA1 may be disposed in the first sub-sensing area SA1, the second pressure sensing area PSA2 may be disposed in the second sub-sensing area SA2, the third pressure sensing area PSA3 may be disposed in the third sub-sensing area SA3, and the fourth pressure sensing area PSA4 may be disposed in the fourth sub-sensing area SA4. The strain gauge SG is disposed in each of the first to fourth pressure sensing areas PSA1, PSA2, PSA3, and PSA4, thereby sensing a touch pressure.

The structures shown in FIGS. 24, 25, 26, 27, and 28 are examples and are not limited thereto. The structure of the touch sensor TSM and the arrangement of the sensing area SA and the pressure sensing area PSA may be variously modified. As described above, since the sensing area SA of the touch sensor TSM includes an area where the touch electrodes TE and RE are arranged to detect the presence or absence of a touch and the position of the touch and an area where the strain gauges SG are arranged to detect a touch pressure, the physical buttons of the display device 1 may be removed, and the touch electrodes TE and RE and the strain gauges SG may be arranged on the same layer to provide a thin touch sensor TSM.

As described above, according to the exemplary embodiments, a touch sensor may be configured to sense the position of a touch input and the pressure of a touch input with respect to various display areas and a display device may include the touch sensor.

The effects of the exemplary embodiments are not limited by the foregoing, and other various effects are anticipated herein.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensor, comprising:
a base layer;
a plurality of first touch electrodes arranged on the base layer in a second direction crossing a first direction;
a plurality of second touch electrodes arranged on the base layer in the first direction;
at least one strain gauge arranged on the base layer and disposed between the plurality of first touch electrodes, the at least one strain gauge being configured to sense a pressure, wherein no other strain gauge besides the at least one strain gauge is disposed on the base layer;
a first connection electrode connecting the plurality of first touch electrodes in the second direction; and
a second connection electrode connecting the plurality of second touch electrodes in the first direction,
wherein the plurality of first touch electrodes and the strain gauge are arranged on a same layer, and wherein each of the plurality of first touch electrodes and each of the plurality of second touch electrodes are electrically insulated from the strain gauge and in which no other strain gauge is electrically connected to any of the plurality of first touch electrodes and any of the second touch electrodes,
wherein the plurality of first touch electrodes are arranged in a plurality of rows and the plurality of second touch electrodes are arranged in a plurality of columns on a top surface of the base layer, in which no strain gauge disposed on the base layer is electrically connected to any of the first touch electrodes and any of the second touch electrodes,
wherein the first connection electrode is disposed between the base layer and the plurality of first touch electrodes,
wherein the second connection electrode and the first connection electrode are disposed on different layers from each other, and the second connection electrode overlaps the first connection electrode in the thickness direction, and
wherein the first connection electrode traverses one of the at least one strain gauge and overlaps the one of the at least one strain gauge at a plurality of points that are spaced apart from one another.

2. The touch sensor of claim 1, wherein the strain gauge among the at least one strain gauge is disposed between the plurality of second touch electrodes.

3. The touch sensor of claim 2, further comprising: a pressure signal line electrically connected to the strain gauge among the at least one strain gauge, the pressure signal line comprising a first portion and a second portion,
wherein the first portion of the pressure signal line extends in the first direction and is disposed between the plurality of first touch electrodes.

4. The touch sensor of claim 3, further comprising: a plurality of sensing lines electrically connected to the plurality of second touch electrodes,
wherein the second portion of the pressure signal line extends in the second direction and is disposed between the plurality of sensing lines.

5. The touch sensor of claim 1, further comprising: a Wheatstone bridge circuit unit electrically connected to the strain gauge among the at least one strain gauge, the Wheatstone bridge circuit unit comprising:
a first node to which a driving voltage is applied;
a second node connected to a ground;
a first output node; and
a second output node,
wherein one end of the strain gauge is electrically connected to the first node, and the other end of the strain gauge is electrically connected to the first output node.

6. The touch sensor of claim 1, further comprising:
a temperature compensation unit disposed between the base layer and the strain gauge,
wherein the strain gauge among the at least one strain gauge comprises at least one resistance line, the temperature compensation unit comprises a temperature compensation pattern, and the temperature compensation pattern overlaps the resistance line in a thickness direction.

7. The touch sensor of claim 6, wherein the temperature compensation unit further comprises a temperature compensation line electrically connected to the temperature compensation pattern and arranged on the same layer as the strain gauge among the at least one strain gauge.

8. The touch sensor of claim 7, further comprising: an insulating layer disposed between the temperature compensation pattern and the resistance line,
wherein the insulation layer comprises a contact hole exposing a part of the temperature compensation pattern, and the temperature compensation line is electrically connected to the temperature compensation pattern through the contact hole.

9. The touch sensor of claim 1, wherein the first direction is a horizontal direction, the second direction is a vertical direction, and the third direction is a diagonal direction hallway between the first and second directions.

10. The touch sensor of claim 1, wherein the at least one strain gauge includes a plurality of bent portions and a portion extending in parallel to the first direction, so as to form a diamond shape of resistance lines.

11. The touch sensor of claim 1, wherein the at least one strain gauge has an angularly spiral shape formed from a single resistance line.

12. The touch sensor of claim 1, wherein the at least one strain gauge has a curvedly spiral shape formed from a single resistance line.

* * * * *